US006697747B2

(12) United States Patent
Marshall Smith

(10) Patent No.: US 6,697,747 B2
(45) Date of Patent: Feb. 24, 2004

(54) QUANTIFYING THE EFFECTIVENESS OF AN OPERATION SUCH AS AN INSPECTION PROCEDURE

(75) Inventor: Richard Francis Marshall Smith, Bristol (GB)

(73) Assignee: Rolls-Royce PLC, London (GB)

( * ) Notice: Subject to any disclaimer, the term of this patent is extended or adjusted under 35 U.S.C. 154(b) by 57 days.

(21) Appl. No.: 09/983,980

(22) Filed: Oct. 26, 2001

(65) Prior Publication Data

US 2002/0082788 A1 Jun. 27, 2002

(30) Foreign Application Priority Data

Oct. 30, 2000 (GB) ............................................ 0026465

(51) Int. Cl.[7] ................................................ G06F 19/00
(52) U.S. Cl. ........................................... 702/83; 702/84
(58) Field of Search ....................... 700/90, 93; 702/35, 702/81, 83, 181, 182, 183, 185

(56) References Cited

U.S. PATENT DOCUMENTS

| | | | | | |
|---|---|---|---|---|---|
| 4,023,911 | A | | 5/1977 | Julesz et al. | |
| 5,408,405 | A | * | 4/1995 | Mozumder et al. | 700/31 |
| 5,442,562 | A | * | 8/1995 | Hopkins et al. | 700/108 |
| 5,684,964 | A | * | 11/1997 | Powers et al. | 705/11 |
| 5,852,818 | A | * | 12/1998 | Guay et al. | 707/1 |
| 6,285,971 | B1 | * | 9/2001 | Shah et al. | 703/2 |
| 6,370,437 | B1 | * | 4/2002 | Carter et al. | 700/52 |

OTHER PUBLICATIONS

Chapman, O;"Risk Based Inspection—Developments in the USA";Int'l Conference On Life Management Of Power Plants; 1994; pp 29–34*

Kosmowski, K;"Issues of the Human Reliability Analysis in the Context of Probabilistic Safety Studies"; Int'l Journal Of Occupational Safety And Ergonomics; vol 1 No 3; pp 276–293.*

Thepvongs, S; Kleiner, B;"Inspection in Process Control"; Proceedings Of 42$^{nd}$ Annual Meeting Of The Human Factors And Ergonomics Society; vol 2; 1998; pp 1170–1174.*

Wen–Hsien–Chen; Tirupati, D;"On–Line Quality Management: Integration of Product Inspection and Process Control"; Production And Operation Management: vol 4 No 3; 1995; pp 242–262.*

(List continued on next page.)

*Primary Examiner*—John Barlow
*Assistant Examiner*—Douglas N Washburn
(74) *Attorney, Agent, or Firm*—Oliff & Berridge, PLC

(57) ABSTRACT

A method of performing an operation comprises operation steps and evaluation steps. The evaluation steps comprise:

identifying a set of performance shaping factors which influence the outcome of the operation;

allocating a probability value to each performance shaping factor, the probability value representing the influence of the respective performance shaping factor on the performance of the operation;

allocating a weighting value to each performance shaping factor, the weighting value representing the significance of the respective performance shaping factor relative to at least one other of the performance shaping factors;

calculating, from the probability values and the weighting values, an effectiveness value representing the effectiveness of the operation.

The operation may be an inspection process, for example on an aircraft or a fleet of aircraft.

17 Claims, 25 Drawing Sheets

EFFECTIVE INSPECTION DIAGRAM-DIRECTED ACYCLIC GRAPH

OTHER PUBLICATIONS

Biffl, S; Halling, M;"Investigating the Influence of Inspector Capability Factors with Four Inspection Techniques on Inspection Performance"; Proceedings 8$^{th}$ IEEE symposium On Software Metrics; May 2002; pp 1–11.*

Starr, A; "A Structured Approach to the Selection of Condition Based Maintenance"; 5$^{th}$ Int'l Conference On Factory 2000; Conference Publication No 435; Apr. 1997; pp 131–138.*

"Human Factors Affecting the Performance of Inspection Personnel in Nuclear Power Plants", EPRI Report NP–6000, Dec. 1988, see section 4, "Conceptual framework".

* cited by examiner

EFFECTIVE PERSONNEL
AGE
ATTENTIVENESS
DETERMINATION
DISTRACTION
EXPERIENCE
EYE SIGHT
FEEDBACK
FEEDBACK HISTORY
JOB SATISFACTION
JUDGMENT
MOTIVATION
MOTOR SKILLS
OFF-JOB PRESSURES
PERSONALITY
PERSONAL FACTORS
PERSONNEL FACTORS
STRESS MENTAL
STRESS PHYSICAL
TIME CONSTRAINTS
TRAINING
VIGILANCE
VISUAL ACUITY
WORKING HOURS

CONDUCIVE ENVIRONMENT
AMBIENT LIGHT
HUMIDITY
NOISE
PROTECTIVE CLOTHING
RAIN, ICE or SNOW
TEMPERATURE

TASK COMPLEXITY
ACCESSIBILITY
COATING
CONTAMINATION
DAMAGE
DAMAGE SHAPE
DAMAGE SIZE
DESIGN
MASKING
PERIODICITY

EFFECTIVE EQUIPMENT
BORESCOPE EQUIPMENT
BORESCOPE INSPECTION
DOCUMENTATION QUALITY
EDDY CURRENT
EQUIPMENT TYPE
OTHER NDT INSPECTION
PHYSICAL EXAMPLE
PROCEDURES
TURNING GEAR
VIDEO EQUIPMENT
WHITE LIGHT

FIG. 1

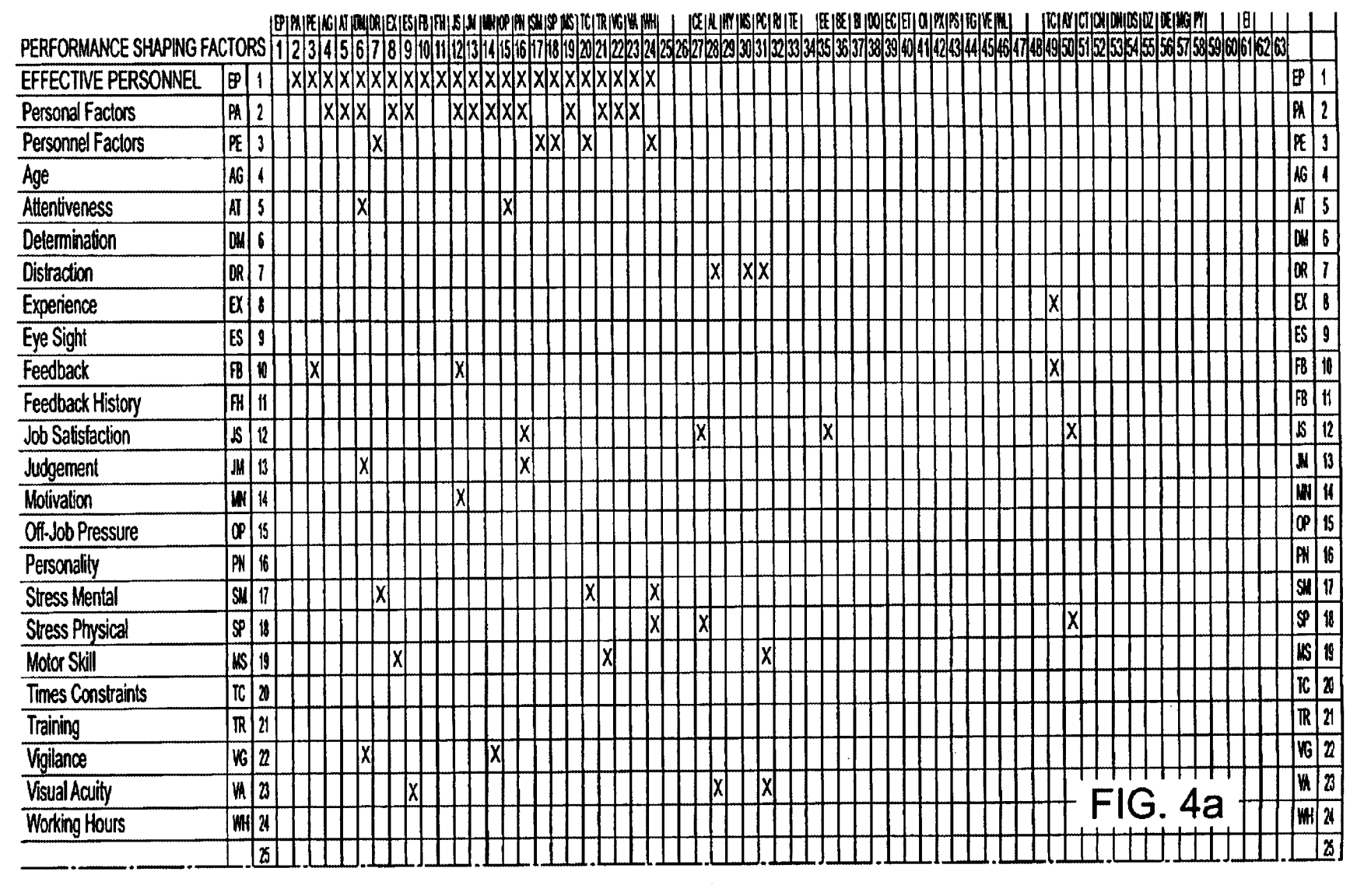

| | | | EP | PA | PE | AG | AT | DM | DR | EX | ES | FB | FH | JS | JM | MN | OP | PN | SM | SP | MS | TC | TR | VG | VA | WH | | | CE | AL | HY | MS | PC | RI | TE | | EE | BE | BI | DO | EC | ET | OI | PX | PS | TG | VE | WL | | | TC | AY | CT | CN | DN | DS | DZ | DE | MG | PY | | | EI | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| PERFORMANCE SHAPING FACTORS | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | | |
| EFFECTIVE PERSONNEL | EP | 1 | | X | X | X | X | X | X | X | X | X | X | X | X | X | X | X | X | X | X | X | X | X | X | X | | | | | | | | | | | | | | | | | | | | | | | | | | | | | | | | | | | | | | EP | 1 |
| Personal Factors | PA | 2 | | | | X | X | X | | X | X | | | X | X | X | X | X | | | X | | X | X | X | | | | | | | | | | | | | | | | | | | | | | | | | | | | | | | | | | | | | | | | PA | 2 |
| Personnel Factors | PE | 3 | | | | | | | X | | | | | | | | | | X | X | | X | | | | X | | | | | | | | | | | | | | | | | | | | | | | | | | | | | | | | | | | | | | PE | 3 |
| Age | AG | 4 | | | | | | | | | | | | | | | | | | | | | | | | | | | | | | | | | | | | | | | | | | | | | | | | | | | | | | | | | | | | | | AG | 4 |
| Attentiveness | AT | 5 | | | | | | X | | | | | | | | | X | | | | | | | | | | | | | | | | | | | | | | | | | | | | | | | | | | | | | | | | | | | | | | | AT | 5 |
| Determination | DM | 6 | | | | | | | | | | | | | | | | | | | | | | | | | | | | | | | | | | | | | | | | | | | | | | | | | | | | | | | | | | | | | | DM | 6 |
| Distraction | DR | 7 | | | | | | | | | | | | | | | | | | | | | | | | | | | | X | | X | X | | | | | | | | | | | | | | | | | | | | | | | | | | | | | | | DR | 7 |
| Experience | EX | 8 | | | | | | | | | | | | | | | | | | | | | | | | | | | | | | | | | | | | | | | | | | | | | | | | X | | | | | | | | | | | | | | EX | 8 |
| Eye Sight | ES | 9 | | | | | | | | | | | | | | | | | | | | | | | | | | | | | | | | | | | | | | | | | | | | | | | | | | | | | | | | | | | | | | ES | 9 |
| Feedback | FB | 10 | | | X | | | | | | | | | X | | | | | | | | | | | | | | | | | | | | | | | | | | | | | | | | | | | | X | | | | | | | | | | | | | | FB | 10 |
| Feedback History | FH | 11 | | | | | | | | | | | | | | | | | | | | | | | | | | | | | | | | | | | | | | | | | | | | | | | | | | | | | | | | | | | | | | FB | 11 |
| Job Satisfaction | JS | 12 | | | | | | | | | | | | | | | | X | | | | | | | | | | | X | | | | | | | | X | | | | | | | | | | | | | | X | | | | | | | | | | | | | JS | 12 |
| Judgement | JM | 13 | | | | | | X | | | | | | | | | | X | | | | | | | | | | | | | | | | | | | | | | | | | | | | | | | | | | | | | | | | | | | | | | JM | 13 |
| Motivation | MN | 14 | | | | | | | | | | | | X | | | | | | | | | | | | | | | | | | | | | | | | | | | | | | | | | | | | | | | | | | | | | | | | | | MN | 14 |
| Off-Job Pressure | OP | 15 | | | | | | | | | | | | | | | | | | | | | | | | | | | | | | | | | | | | | | | | | | | | | | | | | | | | | | | | | | | | | | OP | 15 |
| Personality | PN | 16 | | | | | | | | | | | | | | | | | | | | | | | | | | | | | | | | | | | | | | | | | | | | | | | | | | | | | | | | | | | | | | PN | 16 |
| Stress Mental | SM | 17 | | | | | | | X | | | | | | | | | | | | | X | | | | X | | | | | | | | | | | | | | | | | | | | | | | | | | | | | | | | | | | | | | SM | 17 |
| Stress Physical | SP | 18 | | | | | | | | | | | | | | | | | | | | | | | | X | | | X | | | | | | | | | | | | | | | | | | | | | | X | | | | | | | | | | | | | SP | 18 |
| Motor Skill | MS | 19 | | | | | | | | X | | | | | | | | | | | | | X | | | | | | | | | | X | | | | | | | | | | | | | | | | | | | | | | | | | | | | | | | MS | 19 |
| Times Constraints | TC | 20 | | | | | | | | | | | | | | | | | | | | | | | | | | | | | | | | | | | | | | | | | | | | | | | | | | | | | | | | | | | | | | TC | 20 |
| Training | TR | 21 | | | | | | | | | | | | | | | | | | | | | | | | | | | | | | | | | | | | | | | | | | | | | | | | | | | | | | | | | | | | | | TR | 21 |
| Vigilance | VG | 22 | | | | | | X | | | | | | | | X | | | | | | | | | | | | | | | | | | | | | | | | | | | | | | | | | | | | | | | | | | | | | | | | VG | 22 |
| Visual Acuity | VA | 23 | | | | | | | | | X | | | | | | | | | | | | | | | | | | | X | | | X | | | | | | | | | | | | | | | | | | | | | | | | | | | | | | | VA | 23 |
| Working Hours | WH | 24 | | | | | | | | | | | | | | | | | | | | | | | | | | | | | | | | | | | | | | | | | | | | | | | | | | | | | | | | | | | | | | WH | 24 |
| | | 25 | | | | | | | | | | | | | | | | | | | | | | | | | | | | | | | | | | | | | | | | | | | | | | | | | | | | | | | | | | | | | | | 25 |

FIG. 4a

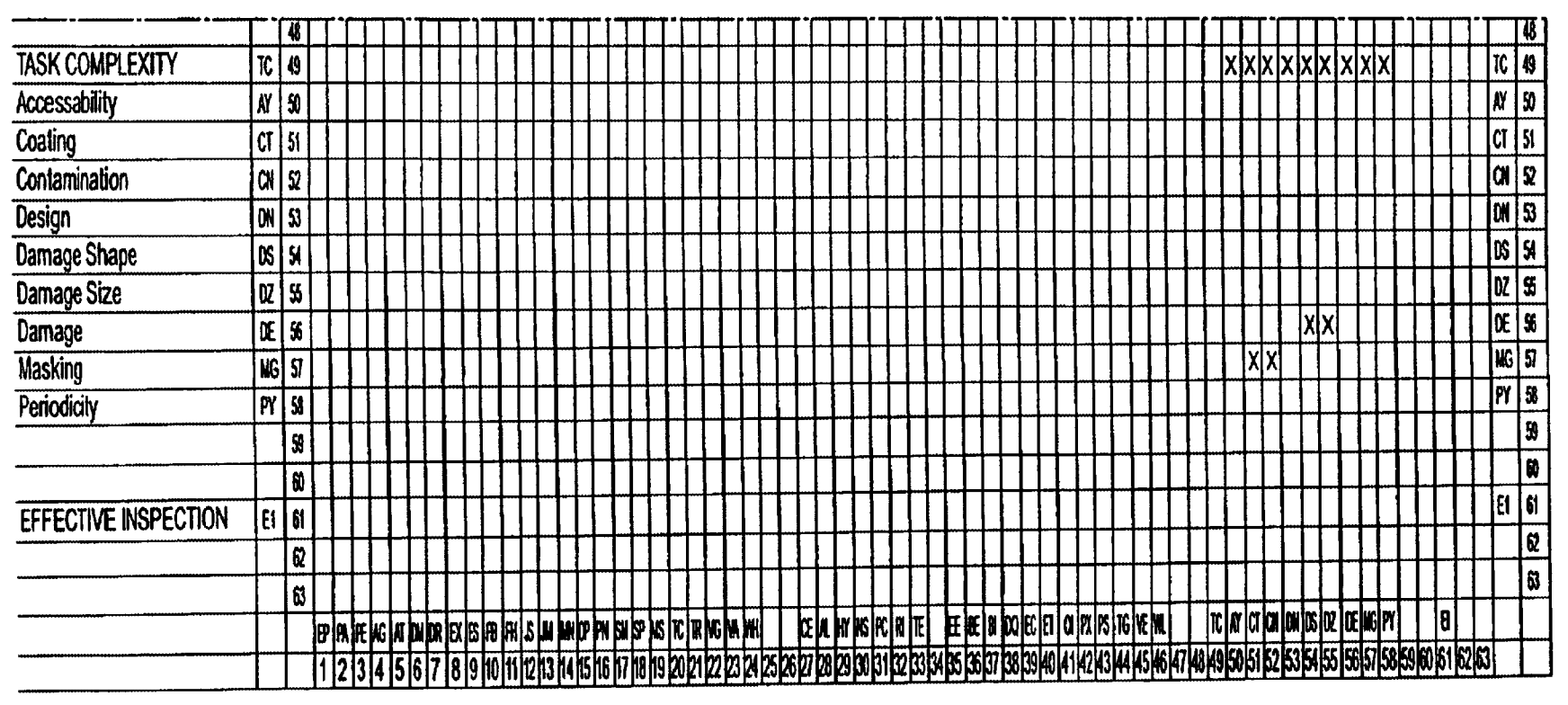

| | | | EP | PA | PE | AG | AT | DM | DR | EX | ES | FB | FH | JS | JM | MN | OP | PN | SM | SP | MS | TC | TR | NG | NA | WH |
|---|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| | | 48 | | | | | | | | | | | | | | | | | | | | | | | | |
| TASK COMPLEXITY | TC | 49 | | | | | | | | | | | | | | | | | | | | | | | | |
| Accessability | AY | 50 | | | | | | | | | | | | | | | | | | | | | | | | |
| Coating | CT | 51 | | | | | | | | | | | | | | | | | | | | | | | | |
| Contamination | CN | 52 | | | | | | | | | | | | | | | | | | | | | | | | |
| Design | DN | 53 | | | | | | | | | | | | | | | | | | | | | | | | |
| Damage Shape | DS | 54 | | | | | | | | | | | | | | | | | | | | | | | | |
| Damage Size | DZ | 55 | | | | | | | | | | | | | | | | | | | | | | | | |
| Damage | DE | 56 | | | | | | | | | | | | | | | | | | | | | | | | |
| Masking | MG | 57 | | | | | | | | | | | | | | | | | | | | | | | | |
| Periodicity | PY | 58 | | | | | | | | | | | | | | | | | | | | | | | | |
| | | 59 | | | | | | | | | | | | | | | | | | | | | | | | |
| | | 60 | | | | | | | | | | | | | | | | | | | | | | | | |
| EFFECTIVE INSPECTION | E1 | 61 | | | | | | | | | | | | | | | | | | | | | | | | |
| | | 62 | | | | | | | | | | | | | | | | | | | | | | | | |
| | | 63 | | | | | | | | | | | | | | | | | | | | | | | | |

| | | | | | CE | JL | HY | NS | FC | RI | TE | | EE | BE | BI | DO | EC | ET | CI | PX | PS | TG | VE | NL | | |
|---|---|---|---|---|---|---|---|---|---|---|---|---|---|---|---|---|---|---|---|---|---|---|---|---|---|---|
| | | | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| | | 48 | | | | | | | | | | | | | | | | | | | | | | | | |
| TASK COMPLEXITY | TC | 49 | | | | | | | | | | | | | | | | | | | | | | | | |
| Accessability | AY | 50 | | | | | | | | | | | | | | | | | | | | | | | | |
| Coating | CT | 51 | | | | | | | | | | | | | | | | | | | | | | | | |
| Contamination | CN | 52 | | | | | | | | | | | | | | | | | | | | | | | | |
| Design | DN | 53 | | | | | | | | | | | | | | | | | | | | | | | | |
| Damage Shape | DS | 54 | | | | | | | | | | | | | | | | | | | | | | | | |
| Damage Size | DZ | 55 | | | | | | | | | | | | | | | | | | | | | | | | |
| Damage | DE | 56 | | | | | | | | | | | | | | | | | | | | | | | | |
| Masking | MG | 57 | | | | | | | | | | | | | | | | | | | | | | | | |
| Periodicity | PY | 58 | | | | | | | | | | | | | | | | | | | | | | | | |
| | | 59 | | | | | | | | | | | | | | | | | | | | | | | | |
| | | 60 | | | | | | | | | | | | | | | | | | | | | | | | |
| EFFECTIVE INSPECTION | E1 | 61 | | | | | | | | | | | | | | | | | | | | | | | | |
| | | 62 | | | | | | | | | | | | | | | | | | | | | | | | |
| | | 63 | | | | | | | | | | | | | | | | | | | | | | | | |

| | | | TC | AY | CT | CN | DN | DS | DZ | DE | MG | PY | | | EI | | | | |
|---|---|---|---|---|---|---|---|---|---|---|---|---|---|---|---|---|---|---|---|
| | | | 49 | 50 | 51 | 52 | 53 | 54 | 55 | 56 | 57 | 58 | 59 | 60 | 61 | 62 | 63 | | |
| | | 48 | | | | | | | | | | | | | | | | | 48 |
| TASK COMPLEXITY | TC | 49 | | X | X | X | X | X | X | X | X | X | | | | | | TC | 49 |
| Accessability | AY | 50 | | | | | | | | | | | | | | | | AY | 50 |
| Coating | CT | 51 | | | | | | | | | | | | | | | | CT | 51 |
| Contamination | CN | 52 | | | | | | | | | | | | | | | | CN | 52 |
| Design | DN | 53 | | | | | | | | | | | | | | | | DN | 53 |
| Damage Shape | DS | 54 | | | | | | | | | | | | | | | | DS | 54 |
| Damage Size | DZ | 55 | | | | | | | | | | | | | | | | DZ | 55 |
| Damage | DE | 56 | | | | | | X | X | | | | | | | | | DE | 56 |
| Masking | MG | 57 | | | X | X | | | | | | | | | | | | MG | 57 |
| Periodicity | PY | 58 | | | | | | | | | | | | | | | | PY | 58 |
| | | 59 | | | | | | | | | | | | | | | | | 59 |
| | | 60 | | | | | | | | | | | | | | | | | 60 |
| EFFECTIVE INSPECTION | E1 | 61 | | | | | | | | | | | | | | | | E1 | 61 |
| | | 62 | | | | | | | | | | | | | | | | | 62 |
| | | 63 | | | | | | | | | | | | | | | | | 63 |

FIG. 4c

| PSF PARENTS | PROB. | LOGIC | |
|---|---|---|---|
| EFFECTIVE PERSONNEL | 0.852 | The probability that the inspector and/or inspection team will find fault given the Human Factors variables | Y |
| PERSONAL FACTORS | 0.866 | The probability that the inspector will find fault given the Human Factors variables | Y |
| PERSONNEL FACTORS | 0.839 | The probability that the inspection team will find fault given the Human Factors variables | Y |
| AGE | 0.950 | The probability that the inspector will find defect given AG e.g. George 22 = 0.7, Bill 35 = 0.95 | W |
| ATTENTIVENESS | 0.960 | The probability that the inspector has good Attentiveness given the DT and OP | Y |
| DETERMINATION | 0.950 | The probability that the inspector has Determination e.g. Sue (Very Determined) = .95 Bill (not DM) = 0.6 | W |
| DISTRACTION | 0.900 | The probability that the inspection team will not be Distracted given AL, NS and PC | Y |
| EXPERIENCE | 0.900 | The probability that the inspector will have requisite Experience | W |
| EYE SIGHT | 0.980 | The probability that the inspector has good Eye Sight e.g. George (20/20) = 1.0 | W |
| FEEDBACK | 0.649 | The probability that the inspection team will give Feedback given PE and TC | Y |
| FEEDBACK HISTORY | 0.700 | The probability that the inspection team feedback lessons learnt | Y |
| JOB SATISFACTION | 0.709 | The probability that the inspector will have requisite Job Satisfaction given PY, CE, EE and AY | Y |
| JUDGMENT | 0.810 | The probability that the inspector will have requisite Judgment given DM and OP | Y |
| MOTIVATION | 0.709 | The probability that the inspector will have requisite Motivation given Job Satisfaction | Y |
| MOTOR SKILL | 0.714 | The probability that the inspector will have requisite Motor Skills given EX, TR, PC or TC | W |
| OFF-JOB PRESSURES | 0.600 | The probability that the inspector has Off-Job Pressures e.g. Rich (Happy) = 0.95, Fred (problem) = 0.6 | W |
| PERSONALITY | 0.850 | The probability that the inspector has requisite Personality e.g. George (Excellent) = 1.0 Bill (o.k.) = 0.8 | Y |

FIG. 5a

| | | | | |
|---|---|---|---|---|
| STRESS MENTAL | 0.788 | The probability that the inspection team will not be under Mental Stress given DT, TC, OP and WH | | Y |
| STRESS PHYSICAL | 0.729 | The probability that the inspection team is not under Physical Stress given WH, AY and CE | | W |
| TIME CONSTRAINTS | 0.700 | The prob. that inspection team is not under pressure from TC e.g. No TC = 1.0, Heavy TC = .5 | | W |
| TRAINING | 0.960 | The prob. that inspector/inspection team has requisite Training e.g. Excellent = 1.0, Poor = .05 | | W |
| VIGILANCE | 0.854 | The probability that the inspector has good Vigilance given DN and MT | | Y |
| VISUAL ACUITY | 0.940 | The probability that the inspector has good Visual Acuity given AL, PC and ES | | Y |
| WORKING HOURS | 0.950 | The probability that inspection team are not under pressure given Working Hours | | W |
| CONDUCIVE ENVIRONMENT | 0.813 | The Probability that the Environment is conducive to effective inspection | | Y |
| AMBIENT LIGHT | 0.900 | The probability that the inspector has ideal AL e.g. Saudi outside = 0.5, Norway inside = 0.95 | | W |
| HUMIDITY | 0.800 | The probability that the inspector has ideal Humidity e.g. 100% HY = 0.5, 80% HY = 0.7, 40% HY = 1.0 | | W |
| NOISE | 0.900 | The probability that the inspector has ideal Noise e.g. Flight Line = 0.85, Workshop 0.75 | | W |
| PROTECTIVE CLOTHING | 0.200 | The prob. that the inspector/team is not encumbered by PC e.g. None = 1.0, NBC = 0.2 | | W |
| RAIN, SNOW or ICE | 0.700 | The probability that the inspector has not got to inspect in RI e.g. RSI = 0.7, No RSI = 1.0 | | W |
| TEMPERATURE | 0.750 | The probability that the inspector has ideal Temperature e.g. 45 deg C = 0.7, 20 deg C = 1.0 | | W |
| EFFECTIVE EQUIPMENT | 0.757 | The probability that the equipment used is conducive to effective inspection | | Y |
| BORESCOPE EQUIPMENT | 0.850 | The prob. that BE is suitable given BI e.g. Blades (with) = 1.0 Blades (w/o) = 0.8, Not BI = 1.1 | | W |
| BORESCOPE INSPECTION | 0.923 | The probability that inspection is effective given TG, BE and VE | | Y |
| DOCUMENTATION QUALITY | 0.850 | The probability that the inspector has good procedures | | W |

| | | | |
|---|---|---|---|
| EDDY CURRENT INSPECTION | 1.000 | The prob. that task requires EC to find fault e.g. Applicable range = 1.0 - 0.5, Not Applicable = 1.0 | W |
| EQUIPMENT TYPE | 0.924 | The probability that inspection is effective given BE or EC or WL or OT | Y |
| OTHER NDT INSPECTION | 1.000 | The probability that task requires OT e.g. Applicable range = 1.0 - 0.5, Not Applicable = 1.0 | W |
| PHYSICAL EXAMPLE | 0.500 | The prob. that the requisite Physical Example is available e.g. Representative Sample = 1.0, None = 0 | W |
| PROCEDURES | 0.810 | The probability that requisite Procedures are available e.g. V. Good = 1.0, OK = 0.85, None = 0 | Y |
| TURNING GEAR | 1.000 | The prob. that Turning Gear is available for BI e.g. Blades (with) = 1.0, Blades (w/o) = 0.8, Not BI = 1.0 | W |
| VIDEO EQUIPMENT | 1.000 | The probability that VE is suitable given BI e.g. With 2nd opinion = 1.0, Without = 0.75 | W |
| WHITE LIGHT INSPECTION | 1.000 | The prob. that task requires WL Inspection e.g. Applicable range - 1.0 - 0.5, Not Applicable - 1.0 | W |
| TASK COMPLEXITY | 0.468 | The probability that fault is easy to find | Y |
| ASSESSABILITY | 0.500 | The prob. that inspector/team has good Accessability e.g. Excellent = 1.0, Poor = 0.75, V. Poor = 0.5 | W |
| COATING | 1.000 | The probability that fault is not masked by Coating e.g. No CT = 1.0, Plat Al = 0.7 | W |
| CONTAMINATION | 0.900 | The prob. that fault is not masked by Contamination e.g. No CN = 1.0, Moderate = 0.8, Bad = 0.5 | W |
| DESIGN | 0.700 | The prob. that the Design makes inspection easy e.g. V.Good = 1.0, Medium = .8, Poor = <0.5 | W |
| DAMAGE SHAPE | 0.700 | The prob. that the Damage Shape is easy to find e.g. Good = 1.0, Medium = 0.8, Bad - <0 5 | W |
| DAMAGE SIZE | 0.800 | The prob. that the Size of damage is easy to find e.g. Good = 1.0 Medium = 0.8, Bad = <0.5 | W |
| DAMAGE | 0.770 | The probability that Damage is easy to find given DS&DZ e.g. Good = 1.0, Medium = 0.8, Bad - <0.5 | Y |
| MASKING | 0.940 | The probability that the fault is not Masked given CT and/or CN | Y |
| PERIODICITY | 0.700 | The prob. that inspection is not carried out to regularly e.g. Low rate = 1.0, Medium = .8, High = <0.5 | W |
| EFFECTIVE INSPECTION | 0.708 | The probability that the Inspection Task is Effective | B |

| PROB. | PERFORMANCE SHAPING FACTOR | PSF PARENTS | POSSIBILITIES | PROBABILITY | JOINT PROBABILITY | LOGIC |
|---|---|---|---|---|---|---|
| 0.867 | EFFECTIVE PERSONNEL (EP) | PERSONAL FACTORS (PA) | P(EP\PA) = | 0.50 | 0.438 | The conditional probability that the inspection task has EP given PA |
| | | | P(PA) = | 0.88 | | Result from PA |
| | | PERSONNEL FACTORS (PE) | P(EP\PE) = | 0.50 | 0.429 | The conditional probability that the inspection task has EP given PE |
| | | | P(PE) = | 0.86 | | Result From PE |

| | | | | | | |
|---|---|---|---|---|---|---|
| 0.876 | PERSONAL FACTORS (PA) | AGE (AG) | P(PA\AG) = | 0.10 | 0.095 | The conditional probability that inspector has capable PA given AG |
| | | | P(AG) = | 0.95 | | The probability that inspector has good PA given AG e.g. George 22 = 0.7, Bill 35 = 0.95 |
| | | ATTENTIVENESS (AT) | P(PA\AT) = | 0.10 | 0.089 | The conditional probability that inspector has capable PA given AT |
| | | | P(AT) = | 0.89 | | The probability that inspector has good PA given AT e.g. George Good = 0.95 Bill Moderate = 0.75 |
| | | JUDGMENT (JM) | P(PA\JM) = | 0.10 | 0.089 | The conditional probability that inspector has capable PA given JM |
| | | | P(JM) = | 0.89 | | The prob. that inspector has good PA given JM e.g. George (Excellent) = 1.0, Bill (o.k.) = 0.8 |
| | | PERSONALITY (PN) | P(PA\PY) = | 0.10 | 0.087 | The conditional probability that inspector has capable PA given PA |
| | | | P(PY) = | 0.87 | | The prob. that inspector has good PA given PY e.g. George (Excellent) = 1.0, Bill (o.k.) = 0.8 |

FIG. 6a

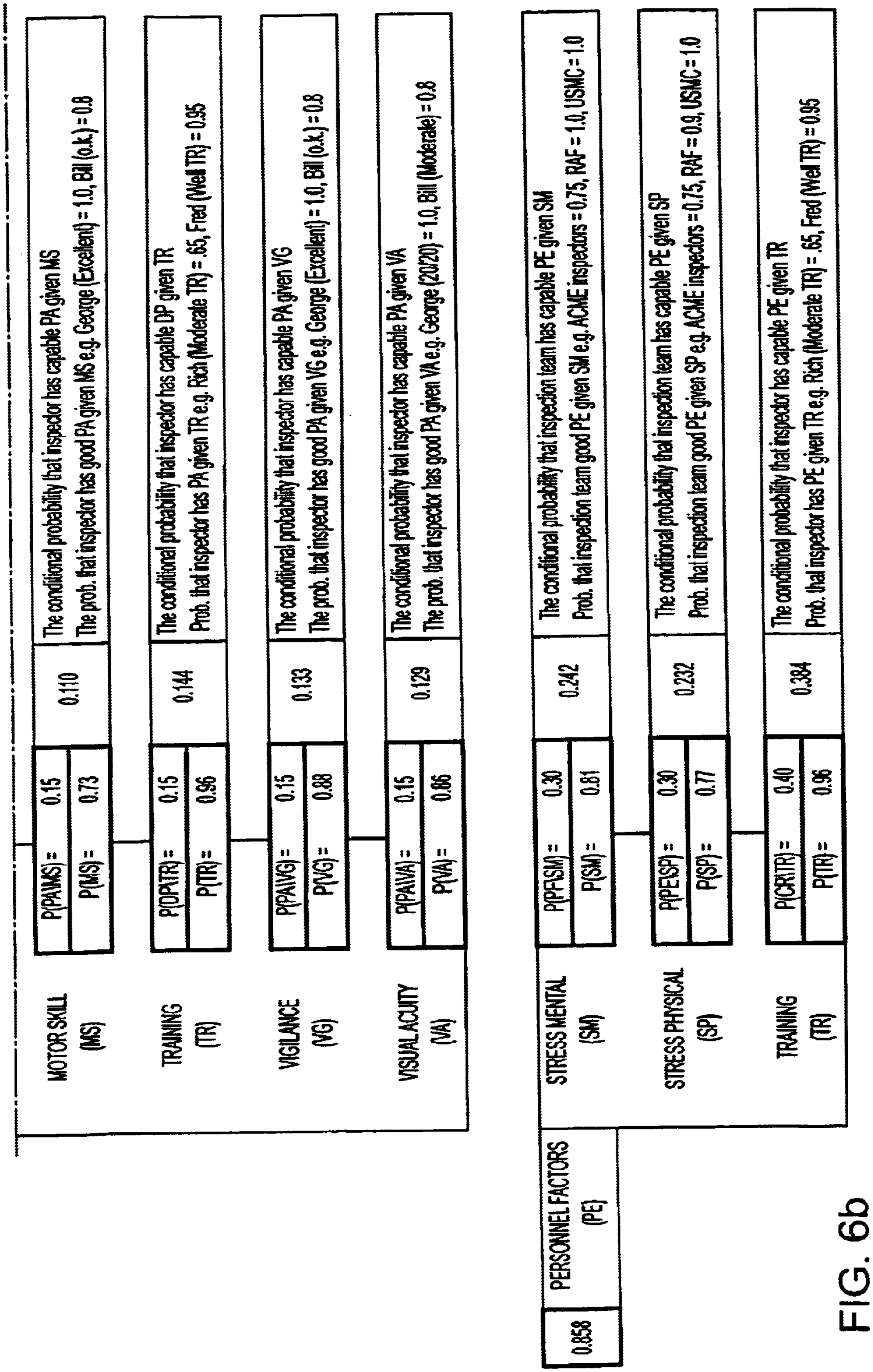

FIG. 6b

| Node | Probabilities | | Description |
|---|---|---|---|
| **MOTOR SKILL (MS)** | P(PA\|MS) = 0.15 | 0.110 | The conditional probability that inspector has capable PA given MS |
| | P(MS) = 0.73 | | The prob. that inspector has good PA given MS e.g. George (Excellent) = 1.0, Bill (o.k.) = 0.8 |
| **TRAINING (TR)** | P(DP\|TR) = 0.15 | 0.144 | The conditional probability that inspector has capable DP given TR |
| | P(TR) = 0.96 | | Prob. that inspector has PA given TR e.g. Rich (Moderate TR) = .65, Fred (Well TR) = 0.95 |
| **VIGILANCE (VG)** | P(PA\|VG) = 0.15 | 0.133 | The conditional probability that inspector has capable PA given VG |
| | P(VG) = 0.88 | | The prob. that inspector has good PA given VG e.g. George (Excellent) = 1.0, Bill (o.k.) = 0.8 |
| **VISUAL ACUITY (VA)** | P(PA\|VA) = 0.15 | 0.129 | The conditional probability that inspector has capable PA given VA |
| | P(VA) = 0.86 | | The prob. that inspector has good PA given VA e.g. George (20/20) = 1.0, Bill (Moderate) = 0.8 |
| **STRESS MENTAL (SM)** | P(PE\|SM) = 0.30 | 0.242 | The conditional probability that inspection team has capable PE given SM |
| | P(SM) = 0.81 | | Prob. that inspection team good PE given SM e.g. ACME inspectors = 0.75, RAF = 1.0, USMC = 1.0 |
| **STRESS PHYSICAL (SP)** | P(PE\|SP) = 0.30 | 0.232 | The conditional probability that inspection team has capable PE given SP |
| | P(SP) = 0.77 | | Prob. that inspection team good PE given SP e.g. ACME inspectors = 0.75, RAF = 0.9, USMC = 1.0 |
| **TRAINING (TR)** | P(CR\|TR) = 0.40 | 0.384 | The conditional probability that inspector has capable PE given TR |
| | P(TR) = 0.96 | | Prob. that inspector has PE given TR e.g. Rich (Moderate TR) = .65, Fred (Well TR) = 0.95 |

PERSONNEL FACTORS (PE) = 0.858

| PROB. | PERFORMANCE SHAPING FACTOR | PSF PARENTS | POSSIBILITIES | PROBABILITY | JOINT PROBABILITY | LOGIC |
|---|---|---|---|---|---|---|
| 0.894 | ATTENTIVENESS (AT) | DETERMINATION (DM) | P(AT\DM) = | 0.70 | 0.630 | The conditional probability that the inspector has capable AT given DM |
| | | | P(DM) = | 0.90 | | Prob. that inspector has AT given DM e.g. Sue (Very Determined) = .95, Bill (not DM) = 0.6 |
| | | OFF-JOB PRESSURES (OP) | P(AT\OP) = | 0.30 | 0.264 | The conditional probability that the inspector has capable AT given OP |
| | | | P(OP) = | 0.88 | | Prob. that inspector has AT given OP e.g. Rich (Happy) = .95, Fred (Gambling problem) = 0.6 |
| 0.839 | DISTRACTION (DR) | AMBIENT LIGHT (AL) | P(DT\AL) = | 0.50 | 0.369 | The conditional probability that inspector is not DR given AL |
| | | | P(AL) = | 0.74 | | Prob. that inspector is not DR given AL e.g. Saudi outside = 0.5, Norway inside = 0.95 |
| | | NOISE (NS) | P(DT\NS) = | 0.50 | 0.468 | The conditional probability that inspector is not DR given NS |
| | | | P(NS) = | 0.94 | | The probability that the inspector is not DR given NS e.g. Flight Line = 0.85, Workshop = 0.75 |
| | | PROTECTIVE CLOTHING (PC) | P(DT\PC) = | 0.00 | 0.002 | The conditional probability that inspector is not DR given PC |
| | | | P(PC) = | 0.99 | | The probability that the inspector is not DR given PC e.g. NDT = 0.5, None = 1.0 |
| 0.508 | EXPERIENCE (EX) | TASK COMPLEXITY (TC) | P(EX\TC) = | 1.00 | 0.508 | The conditional probability that inspector is not EX given TC |
| | | | P(TC) = | 0.51 | | The probability that the TC is less than inspector EX e.g. Sufficient = 1.0, Poor = 0.5 |

FIG. 6c

| PROB. | PERFORMANCE SHAPING FACTOR | PSF PARENTS | POSSIBILITIES | PROBABILITY | JOINT PROBABILITY | LOGIC |
|---|---|---|---|---|---|---|
| 0.892 | JUDGEMENT (JM) | DETERMINATION (DM) | P(JM\DM) = | 0.6 | 0.54 | The conditional probability that inspector has good JM given DM |
| | | | P(DM) = | 0.9 | | Prob.that inspector has JM given DN e.g. Excellent = 1.0, Poor = 0.75, V.Poor = < 0.5 |
| | | OFF-JOB PRESSURES (OP) | P(JM\OP) = | 0.40 | 0.352 | The conditional probability that inspector has good JM given OP |
| | | | P(OP) = | 0.88 | | Prob. that inspector has JM given OP e.g. Excellent = 1.0, Poor = 0.75, V. Poor = 0.5 |
| 0.859 | MOTIVATION (MN) | JOB SATISFACTION (JS) | P(MV\JS) = | 1.00 | 0.859 | The conditional probability that inspector has MN given JS |
| | | | P(JS) = | 0.86 | | Prob. that inspector has MN long SJ e.g. George (Little effect) = .95, Bill (Moderate) = 0.7 |
| 0.733 | MOTOR SKILLS (MS) | EXPERIENCE (EX) | P(MS\EX) = | 0.50 | 0.253 | The conditional probability that inspector has MN given EX |
| | | | P(EX) = | 0.51 | | Prob. that Inspector has good MN given EX e.g. Excellent 1.0, Poor 0.75, V. Poor 0.5 |
| | | TRAINING (TR) | P(MS\TR) = | 0.50 | 0.478 | The conditional probability that inspector has MN given TR |
| | | | P(TR) = | 0.96 | | Prob. that inspector has MN given TR e.g. Rich (Moderate TR) = .65, Fred (Well TR) = 0.95 |
| | | PROTECTIVE CLOTHING (PC) | P(MS\PC) = | 0.00 | 0.002 | The conditional probability that inspector has MN given PC |
| | | | P(PC) = | 0.99 | | The probability that the inspector has good MN given PC e.g. NDT = 0.5, None = 1.0 |

FIG. 6e

| VIGILANCE (VG) | | | | |
|---|---|---|---|---|
| 0.884 | DETERMINATION (DM) | P(VG\|DM) = 0.60 | 0.540 | The conditional probability that inspector has VG given DM<br>Prob. that inspector has good VG given DM e.g. Fred (Good DM) = 0.95, Bill (Poor) = 0.8 |
| | | P(DM) = 0.90 | | |
| | MOTIVATION (MN) | P(VG\|MN) = 0.40 | 0.344 | The conditional probability that inspector has VG given MN<br>Prob. that inspector has good VG given MN e.g. Fred (Good MN) = 0.9, Bill (Poor) = 0.7 |
| | | P(MN) = 0.86 | | |

| PROB. | PERFORMANCE SHAPING FACTOR | PSF PARENTS | POSSIBILITIES | PROBABILITY | JOINT PROBABILITY | LOGIC |
|---|---|---|---|---|---|---|
| 0.861 | VISUAL ACUITY (VA) | EYE SIGHT (ES) | P(VA\ES) = | 0.50 | 0.490 | The conditional probabilitg that the inspector has VA given good ES |
| | | | P(ES) = | 0.98 | | Prob. that inspector has VA given ES e.g. George (20/20) = 1.0 Note Specs default = 0.9 |
| | | AMBIENT LIGHT (AL) | P(VA\AL) = | 0.50 | 0.370 | The conditional probability that inspector has capable VA given good AL |
| | | | P(AL) = | 0.74 | | The probability that AL decreases VA e.g. 2000 lumen = 0.95, 3000 lumen = 0.5, 2500 lumen = 0.99 |
| | | PROTECTIVE CLOTHING (PC) | P(VA\PC) = | 0.00 | 0.001 | The conditional probability that inspector has capable VA given no PC |
| | | | P(PC) = | 0.99 | | The probability that PC decreases VA e.g Wearing = 0.8, Not wearing = 1.0 |

FIG. 6h

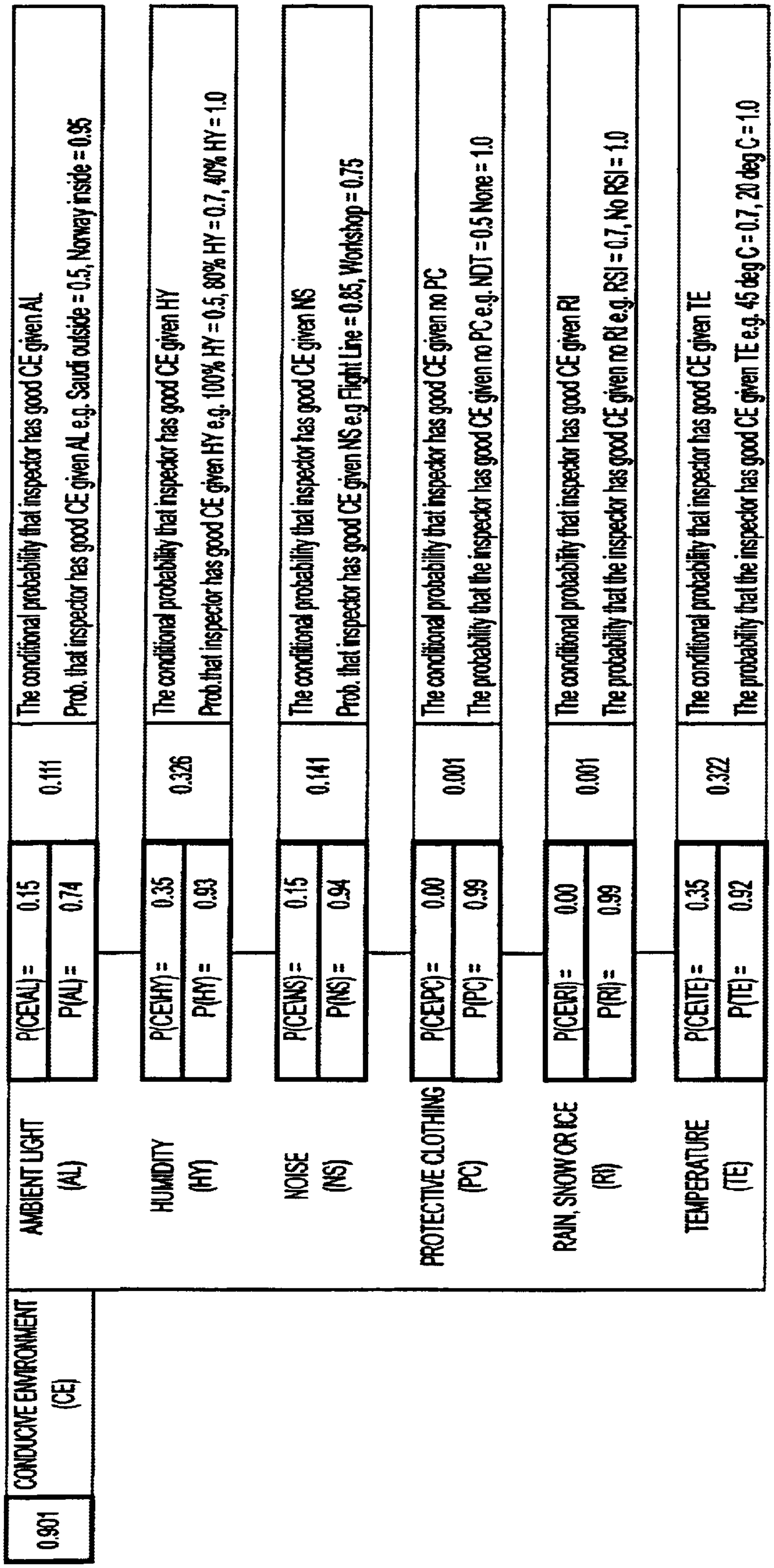

FIG. 6i

| | | | |
|---|---|---|---|
| CONDUCIVE ENVIRONMENT (CE) | AMBIENT LIGHT (AL) | P(CE\|AL) = 0.15 | 0.111 | The conditional probability that inspector has good CE given AL. |
| 0.901 | | P(AL) = 0.74 | | Prob. that inspector has good CE given AL e.g. Saudi outside = 0.5, Norway inside = 0.95 |
| | HUMIDITY (HY) | P(CE\|HY) = 0.35 | 0.326 | The conditional probability that inspector has good CE given HY |
| | | P(HY) = 0.93 | | Prob. that inspector has good CE given HY e.g. 100% HY = 0.5, 80% HY = 0.7, 40% HY = 1.0 |
| | NOISE (NS) | P(CE\|NS) = 0.15 | 0.141 | The conditional probability that inspector has good CE given NS |
| | | P(NS) = 0.94 | | Prob. that inspector has good CE given NS e.g. Flight Line = 0.85, Workshop = 0.75 |
| | PROTECTIVE CLOTHING (PC) | P(CE\|PC) = 0.00 | 0.001 | The conditional probability that inspector has good CE given no PC |
| | | P(PC) = 0.99 | | The probability that the inspector has good CE given no PC e.g. NDT = 0.5 None = 1.0 |
| | RAIN, SNOW OR ICE (RI) | P(CE\|RI) = 0.00 | 0.001 | The conditional probability that inspector has good CE given RI |
| | | P(RI) = 0.99 | | The probability that the inspector has good CE given no RI e.g. RSI = 0.7, No RSI = 1.0 |
| | TEMPERATURE (TE) | P(CE\|TE) = 0.35 | 0.322 | The conditional probability that inspector has good CE given TE |
| | | P(TE) = 0.92 | | The probability that the inspector has good CE given TE e.g. 45 deg C = 0.7, 20 deg C = 1.0 |

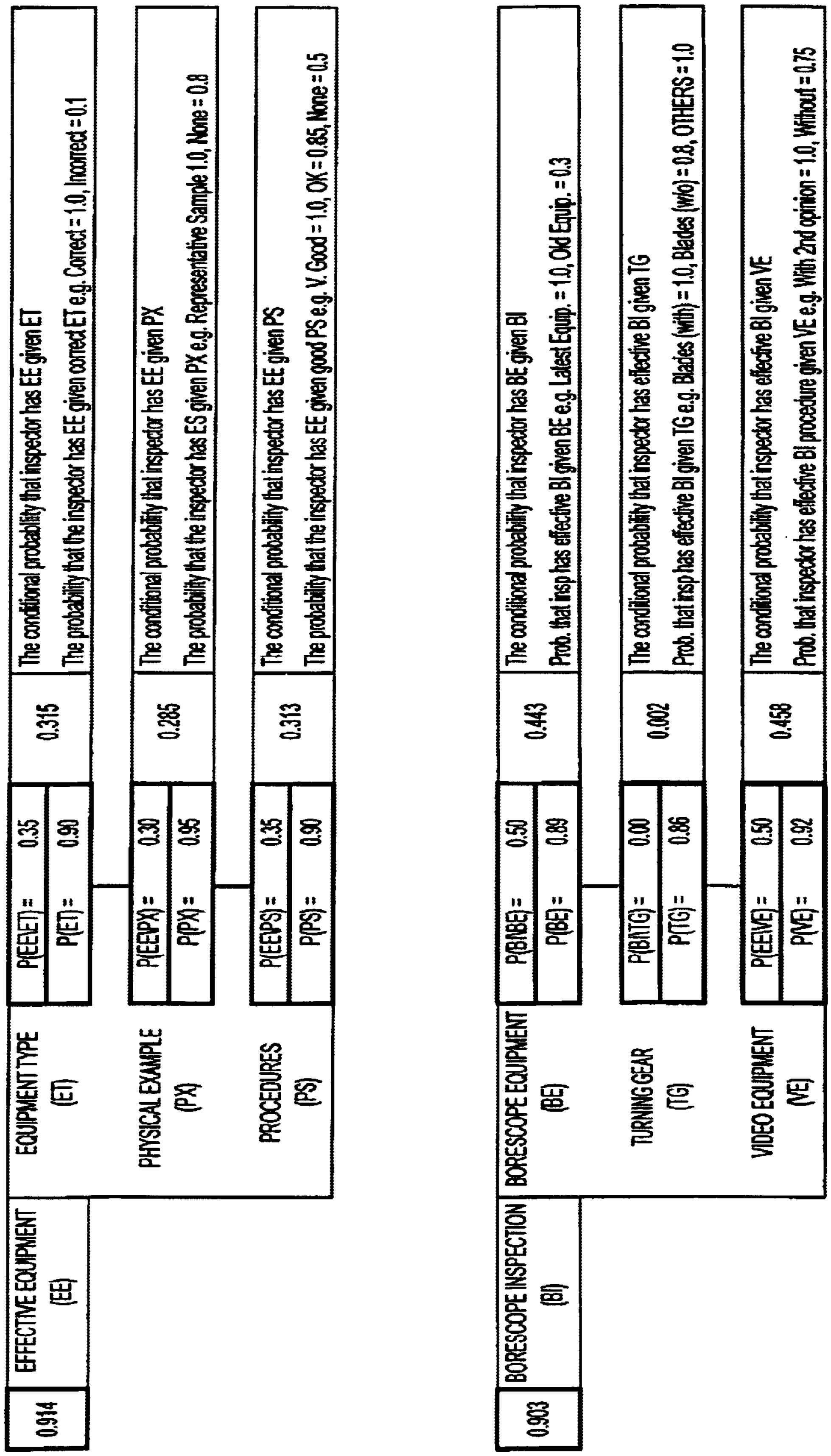

FIG. 6j

EFFECTIVE EQUIPMENT (EE): 0.914

| Parent Node | Probabilities | | Description |
|---|---|---|---|
| EQUIPMENT TYPE (ET) | P(EE\|ET) = 0.35 | | The conditional probability that inspector has EE given ET |
| | P(ET) = 0.90 | 0.315 | The probability that the inspector has EE given correct ET e.g. Correct = 1.0, Incorrect = 0.1 |
| PHYSICAL EXAMPLE (PX) | P(EE\|PX) = 0.30 | | The conditional probability that inspector has EE given PX |
| | P(PX) = 0.95 | 0.285 | The probability that the inspector has ES given PX e.g. Representative Sample 1.0, None = 0.8 |
| PROCEDURES (PS) | P(EE\|PS) = 0.35 | | The conditional probability that inspector has EE given PS |
| | P(PS) = 0.90 | 0.313 | The probability that the inspector has EE given good PS e.g. V.Good = 1.0, OK = 0.85, None = 0.5 |

BORESCOPE INSPECTION (BI): 0.903

| Parent Node | Probabilities | | Description |
|---|---|---|---|
| BORESCOPE EQUIPMENT (BE) | P(BI\|BE) = 0.50 | | The conditional probability that inspector has BE given BI |
| | P(BE) = 0.89 | 0.443 | Prob. that insp has effective BI given BE e.g. Latest Equip. = 1.0, Old Equip. = 0.3 |
| TURNING GEAR (TG) | P(BI\|TG) = 0.00 | | The conditional probability that inspector has effective BI given TG |
| | P(TG) = 0.86 | 0.002 | Prob. that insp has effective BI given TG e.g. Blades (with) = 1.0, Blades (w/o) = 0.8, OTHERS = 1.0 |
| VIDEO EQUIPMENT (VE) | P(EE\|VE) = 0.50 | | The conditional probability that inspector has effective BI given VE |
| | P(VE) = 0.92 | 0.458 | Prob. that inspector has effective BI procedure given VE e.g. With 2nd opinion = 1.0, Without = 0.75 |

| PROB. | PERFORMANCE SHAPING FACTOR | PSF PARENTS | POSSIBILITIES | PROBABILITY | JOINT PROBABILITY | LOGIC |
|---|---|---|---|---|---|---|
| 0.900 | EQUIPMENT TYPE (ET) | BORESCOPE INSPECTION (BE) | P(ET\BE) = | 1.00 | 0.900 | The conditional probability that inspector has correct ET given BI |
| | | | P(BE) = | 0.90 | | Prob. that inspector has effective ET given BE e.g. Applicable range = 1.0 - 0.5, Not Applicable = 1.0 |
| | | EDDY CURRENT INSPECTION (EC) | P(ET\EC) = | 0.00 | 0.000 | The conditional probability that Inspector has correct ET given EC |
| | | | P(EC) = | 0.01 | | Prob. that inspector has effective ET given EC e.g. Applicable range = 1.0 - 0.5, Not Applicable = 1.0 |
| | | OTHER NDT INSPECTION (OI) | P(ET\OI) = | 0.00 | 0.000 | The conditional probability that inspector has correct ET given OI |
| | | | P(OI) = | 0.01 | | Prob. that Inspector has effective ET given OI e.g. Applicable range = 1.0 - 0.5, Not Applicable = 1.0 |
| | | WHITE LIGHT INSPECTION (WL) | P(ET\WL) = | 0.00 | 0.000 | The conditional probability that inspector has correct ET given WL |
| | | | P(WL) = | 0.01 | | Prob. that inspector has effective ET given WL e.g. Applicable range = 1.0 - 0.5, Not Applicable = 1.0 |
| 0.895 | PROCEDURES (PS) | FEEDBACK (FB) | P(PS\FB) = | 0.20 | 0.135 | The conditional probability that inspector has correct PS given FB |
| | | | P(FB) = | 0.68 | | The probability that PS is good given FB e.g; Good = 1.0, Poor = <0.5 |
| | | DOCUMENTATION QUALITY (DQ) | P(PS\HF) = | 0.80 | 0.760 | The conditional probability that inspector has correct PS given DQ |
| | | | P(HF) = | 0.95 | | The probability that PS is good given DQ e.g. Good = 1.0, Poor = <0.5 |

FIG. 6k

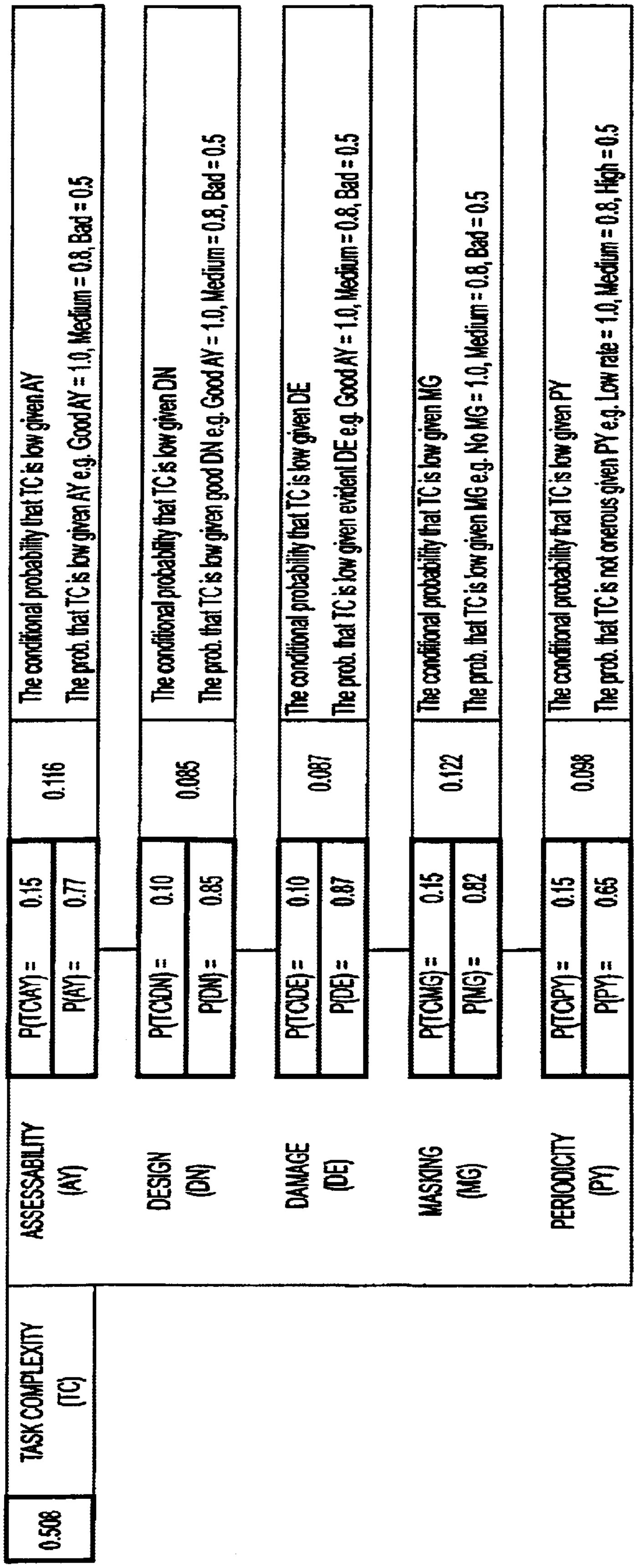

FIG. 6I

| TASK COMPLEXITY (TC) | | | | |
|---|---|---|---|---|
| 0.508 | | | | |

| ASSESSABILITY (AY) | P(TC\|AY) = | 0.15 | 0.116 | The conditional probability that TC is low given AY |
| | P(AY) = | 0.77 | | The prob. that TC is low given AY e.g. Good AY = 1.0, Medium = 0.8, Bad = 0.5 |
| DESIGN (DN) | P(TC\|DN) = | 0.10 | 0.085 | The conditional probability that TC is low given DN |
| | P(DN) = | 0.85 | | The prob. that TC is low given good DN e.g. Good AY = 1.0, Medium = 0.8, Bad = 0.5 |
| DAMAGE (DE) | P(TC\|DE) = | 0.10 | 0.087 | The conditional probability that TC is low given DE |
| | P(DE) = | 0.87 | | The prob. that TC is low given evident DE e.g. Good AY = 1.0, Medium = 0.8, Bad = 0.5 |
| MASKING (MG) | P(TC\|MG) = | 0.15 | 0.122 | The conditional probability that TC is low given MG |
| | P(MG) = | 0.82 | | The prob. that TC is low given MG e.g. No MG = 1.0, Medium = 0.8, Bad = 0.5 |
| PERIODICITY (PY) | P(TC\|PY) = | 0.15 | 0.098 | The conditional probability that TC is low given PY |
| | P(PY) = | 0.65 | | The prob. that TC is not onerous given PY e.g. Low rate = 1.0, Medium = 0.8, High = 0.5 |

| PROB. | PERFORMANCE SHAPING FACTOR | PSF PARENTS | POSSIBILITIES | PROBABILITY | JOINT PROBABILITY | LOGIC |
|---|---|---|---|---|---|---|
| 0.873 | DAMAGE (DE) | DAMAGE SHAPE (DS) | P(TC\DS) = | 0.30 | 0.264 | The conditional probability that DE is evident DS |
| | | | P(DS) = | 0.88 | | The prob. that DE is evident DS e.g. Good AY = 1.0, Medium = 0.8, Bad = 0.5 |
| | | DAMAGE (DZ) | P(TC\DZ) = | 0.70 | 0.609 | The conditional probability that DE is evident DZ |
| | | | P(DZ) = | 0.87 | | The prob. that DE is evident DZ e.g. Good AY = 1.0, Medium = 0.8, Bad = 0.5 |
| 0.816 | MASKING (MG) | COATING (CT) | P(MG\CT) = | 0.40 | 0.396 | The conditional probability that MG is low given CT |
| | | | P(CT) = | 0.99 | | The probability that defect is not Masked given CT e.g. No CT = 1.0, Plat Al = 0.5 |
| | | CONTAMINATION (CN) | P(MG\CN) = | 0.60 | 0.420 | The conditional probability that MG is low given CN |
| | | | P(CN) = | 0.70 | | The probability that defect is not Masked given CN e.g. No CN = 1.0, Moderate = 0.8, Bad = 0.5 |

FIG. 6m

| EFFECTIVE INSPECTION (EI) | EFFECTIVE PERSONNEL (EP) | P(EI\|EP) = | 0.40 | | 0.347 | The conditional probability that the inspection task is an EI given EP |
|---|---|---|---|---|---|---|
| 0.773 | | P(EP) = | 0.87 | | | Result from EP |
| | EFFECTIVE EQUIPMENT (EE) | P(EI\|EE) = | 0.30 | | 0.274 | The conditional probability that the inspection task is an EI given EE |
| | | P(EE) = | 0.91 | | | Result From EP |
| | TASK COMPLEXITY (TC) | P(EI\|TC) = | 0.30 | | 0.152 | The conditional probability that the inspection task is an EI given the TC |
| | | P(TC) = | 0.51 | | | Result from EP |

| EFFECTIVE INSPECTION (EI) | P(FR\|EI) = | 0.77 | | The probability that the inspection task is Effective |
|---|---|---|---|---|
| | P(EI) = | | | Result from EI |

| FLEET RISK (FR) | COMPONENT LIFE CHAR. (CC) | P(FR\|CC) = | | Result from studies carried out by Reliability/Engineering into CC |
|---|---|---|---|---|
| | | P(CC) = | | |

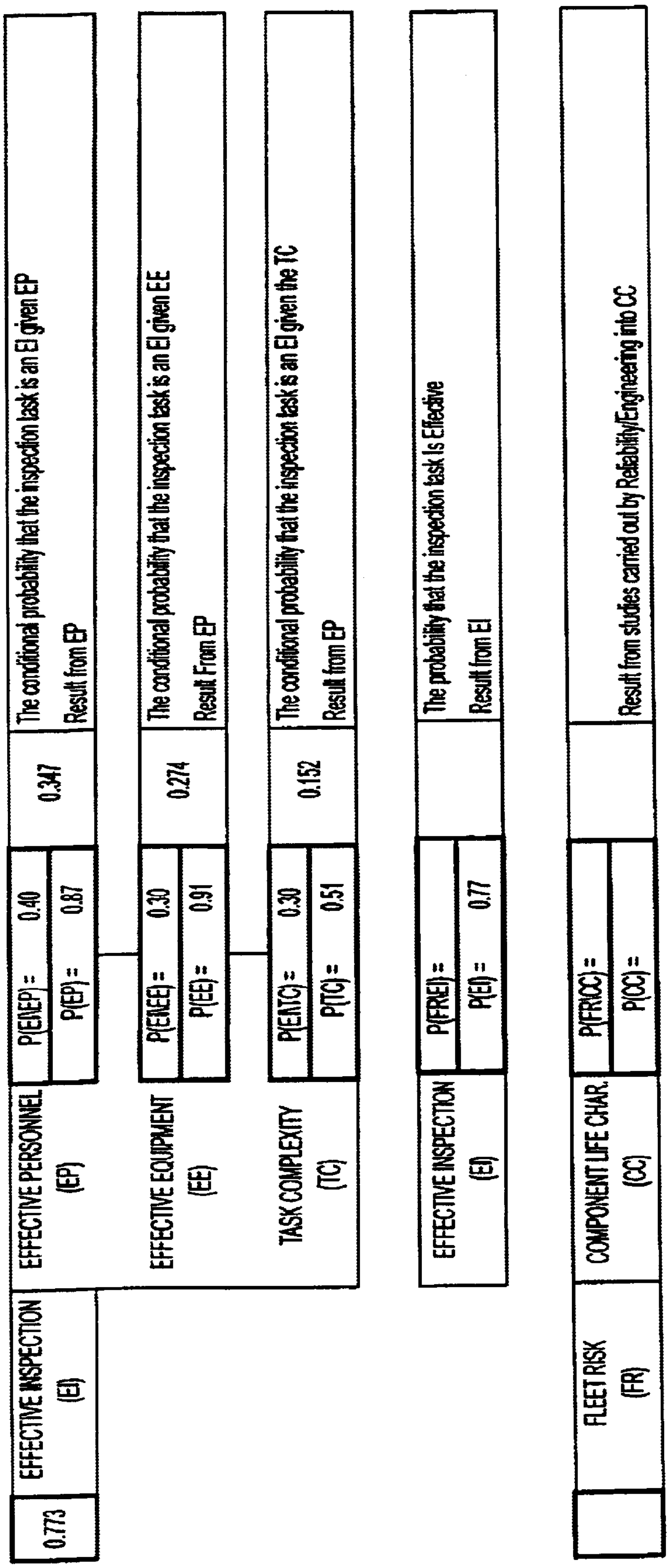

FIG. 6n

| HAZARD CLASSIFICATION I.E. SEVERITY \ PROBABILTY PER FLIGHT HOUR | | FREQUENT $>10^{-3}$ (A) | PROBABLE $10^{-3}$ TO $10^{-4}$ (B) | OCCASIONAL $10^{-4}$ TO $10^{-5}$ (C) | REMOTE $10^{-5}$ TO $10^{-6}$ (D) | IMPROBABLE $<10^{-6}$ (E) |
|---|---|---|---|---|---|---|
| | | >1000 / 1000 | 100 | 10 | 1 | <1 |
| CATASTROPHIC | I | 1 | 2 | 4 | 8 | 12 |
| CRITICAL | II | 3 | 5 | 6 | 10 | 15 |
| MARGINAL | III | 7 | 9 | 11 | 14 | 17 |
| NEGLIGIBLE | IV | 13 | 16 | 18 | 19 | 20 |

FIG. 7

QUANTIFYING THE EFFECTIVENESS OF AN OPERATION SUCH AS AN INSPECTION PROCEDURE

INTRODUCTION

This invention relates to a method of performing an operation in which the effectiveness of the operation is quantified. The invention is particularly, although not exclusively, concerned with the performance of an operation in the form of an inspection procedure such as an inspection procedure on a component of a gas turbine engine in an aircraft.

BACKGROUND OF THE INVENTION AND PRIOR ART

When a failure occurs in an aircraft in service, steps are taken to understand the underlying cause of the failure so that a plan can be formulated to manage the safety of the fleet (i.e. all other aircraft susceptible to the same failure) against the possibility of reoccurrence. One or more compensating actions will be introduced to keep the fleet flying safely. The entire fleet may be grounded, but the economic consequences of this action are severe, and so it is rarely feasible to ground a fleet until the failed component has been replaced by one which has been redesigned to eliminate the possibility of future failure. Consequently, a common approach is to introduce an inspection task which is intended to have a sufficiently high probability of finding a potential weakness or incipient failure before it becomes a functional failure. This action is often used as an interim measure until a permanent solution such as a component modification is developed. When an inspection task is used as a compensating action, the safety of the fleet (during continued operation) depends significantly on the effectiveness of the inspection as well as on a correct understanding of the failure mechanics and the characteristic life of the component.

The failure probability of a component which is subject to periodic inspection is dependent on two sets of variables: an understanding and numerical quantification of 1) the component characteristic life and 2) the probability of the inspection effectiveness. While formal scientific methods have been developed and are commonly used to derive numerical quantification of component life, inspection effectiveness is generally determined by expert judgement applied in varying degrees and on some occasion by experiment. As a result, errors may arise in the assessment of inspection effectiveness, which can have serious consequences. Also, it is frequently difficult to justify objectively the effectiveness of an inspection.

There are many variables which contribute to inspection effectiveness. The inspection personnel of each fleet operator (or others such as professional non-destructive testing (NDT) companies) who carry out inspection have differing capabilities due to training, experience etc. Effectiveness will also be influenced, for example, by the quality of the inspection equipment available and the environment in which inspection takes place.

An object of the invention is to provide a method of quantifying the effectiveness of an inspection process. Another object of the invention is to provide a method of inspection which includes an evaluation of the effectiveness of the inspection process.

A further object of the invention is to provide a method of assessing the safety of equipment such as an aircraft or an aircraft fleet, in which evaluation is made of the effectiveness of inspection processes carried out on the equipment.

SUMMARY OF THE INVENTION

According to one aspect of the present invention there is provided a method of performing an operation comprising operation steps and evaluation steps, the evaluation steps comprising:

- identifying a set of performance shaping factors which influence the outcome of the operation;
- allocating a probability value to each performance shaping factor, the probability value representing the influence of the respective performance shaping factor on the performance of the operation;
- allocating a weighting value to each performance shaping factor, the weighting value representing the significance of the respective performance shaping factor relative to at least one other of the performance shaping factors;
- calculating, from the probability values and the weighting values, an effectiveness value representing the effectiveness of the operation.

While a method in accordance with the present invention can be used for a wide variety of operations, it is particularly useful where the operation is an inspection process. In a preferred application of the present invention, the operation is an inspection process carried out on a component of a gas turbine engine.

The operation steps may be carried out before or after the evaluation steps.

If the operation steps are carried out before the evaluation steps, the effectiveness value may be used to vary one or more of the operation steps, or the conditions under which they are carried out, of a future similar operation. If the operation steps are carried out after the evaluation steps, the effectiveness value may be used to determine one or more of the operation steps, or the conditions under which they are carried out. The conditions under which operation steps are carried out may include, by way of example, the nature, qualifications or experience of personnel conducting the respective operation steps, the ambient conditions or the equipment used.

Alternatively, or in addition, the effectiveness value may be employed in conjunction with other factors to assess the safety of continued operation of an aircraft, vessel or other means of transport, or of fixed or moveable equipment such as a power plant, for example a nuclear power plant.

According to a second aspect of the present invention, there is provided a method of assessing the safety of equipment including a component subject to periodic inspection, the inspection comprising inspection steps and evaluation steps, the evaluation steps comprising:

- identifying a set of performance shaping factors which influence the outcome of the inspection;
- allocating a probability value to each performance shaping factor, the probability value representing the influence of the respective performance shaping factor on the performance of the inspection;
- allocating a weighting value to each performance shaping factor, the weighting value representing the significance of the respective performance shaping factor relative to at least one other of the performance shaping factors;
- calculating, from the probability values and the weighting values, an effectiveness value representing the effectiveness of the inspection;

utilising the effectiveness value to determine the probability of undetected failure of the component;

determining the consequence of failure of the component in operation of the equipment; and comparing the probability of undetected failure and the consequence of failure with predetermined criteria and, on the basis of the comparison, either withdrawing the equipment from operational service or continuing operational service.

Preferably, the methods in accordance with the first and second aspects of the present invention are embodied in computer programs, and consequently, in accordance with a third aspect of the present invention there is provided a computer programmed to perform a method in accordance with the first and second aspects of the present invention.

BRIEF DESCRIPTION OF THE DRAWINGS

FIG. 1 depicts four domains of performance shaping factors for an inspection task on a component of a gas turbine engine, FIGS. 4*a*–4*c* show a Cause and Effect Matrix Diagram for the Performance Shaping Factors mentioned in FIG. 3.

FIGS. 5*a*–5*c* show a chart of a Probabilistic Model—Data Interface Sheet, FIG. 7 is a matrix of hazard risk index.

DETAILED DESCRIPTION OF A PREFERRED EMBODIMENT

Figure 2A:
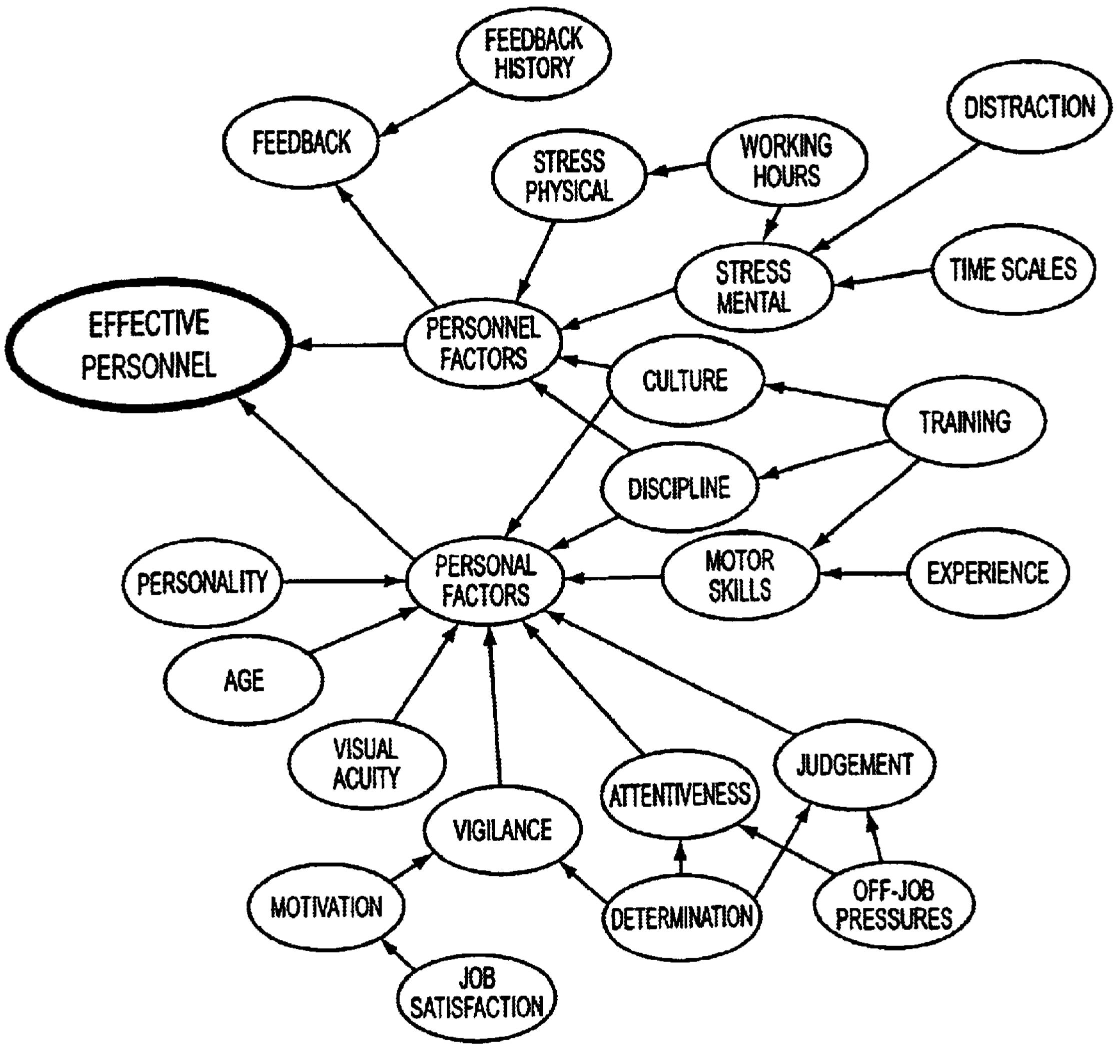
FIG. 2*a* shows an Effective Personnel Diagram.

The field of inspection can be grouped into three categories:

1) Inspection of new components—components in this category are clean and inspection for correct manufacture is required. This includes dimensional checks, surface finish of parent material and coating(s).

2) Inspection of used components—these components can be dirty or clean prior to repair action or they can be clean after repair action.

3) Inspection of components in operation (in-service inspections)—these components are built into Assemblies, Modules and Engines and are often difficult to get to and are generally dirty from operation.

Category 1 and 2 inspections are generally conducted in good to ideal conditions. The inspection is done on clean components in a clean environment by a qualified, experienced and full-time inspector sat at an inspection table, often in an air conditioned room with ideal lighting. At worst they are carried out in a workshop. Category 3 inspections are often carried out in poor conditions, with the components installed in the engine, and with the engine installed in an aircraft. Two examples of the kind of conditions encountered in category 3 inspections are:

1) The inspector's body contorted around obstacles with engine or hydraulic oil dripping on him in driving rain at 0100 hours on the heaving deck of an aircraft carrier. The task should have been completed ten minutes ago.

2) The aircraft could be parked on a concrete apron hot enough to fry an egg. A borescope inspection is required when the ambient light level is so great that it is very difficult to make out the component let alone the loss of resistance to the failure mode.

Perspiration may well be stinging the inspector's eyes.

Category 3 inspections, carried out in more varied and difficult conditions, with dirt contamination, commonly involve one of the most demanding and variable types of inspection in terms of skill, namely the use of the borescope.

Inspection of components, whether as part of an assembly inside a run engine or in component form at a workstation have varying degrees of difficulty for the inspector. The degree of difficulty is determined by the position of the component in the engine, the type of fault that is being looked for, and the amount of masking the defect may have.

Any or all of these aspects apply to inspections and must be part of the determination of inspection effectiveness. The reliability of the inspection task is affected by a number of performance shaping factors which can be grouped or classified into four domains when considered in relation to the end goal of achieving effective inspections:

a) Effective Personnel, including Personal Factors and Personnel Factors b) Conducive Environment c) Effective Equipment, including Equipment Type, and d) Task Complexity including Masking and Damage.

A table listing a typical set of performance shaping factors in these four domains for a borescope inspection task is illustrated in FIG. 1.

An understanding of the relationships between the performance shaping factors allows mathematical techniques to be applied.

Starting from the four domains of FIG. 1 the relationships between the performance shaping factors can be analysed in a series of steps. By developing the relationships between the factors in each of the four domains these relationships are represented in diagrammatic form in FIGS. 2*a* to 2*d*, which show each of the four domains individually. In a further step the four domains may be integrated and FIG. 3 illustrates their overall relationship.

Figure 4B:
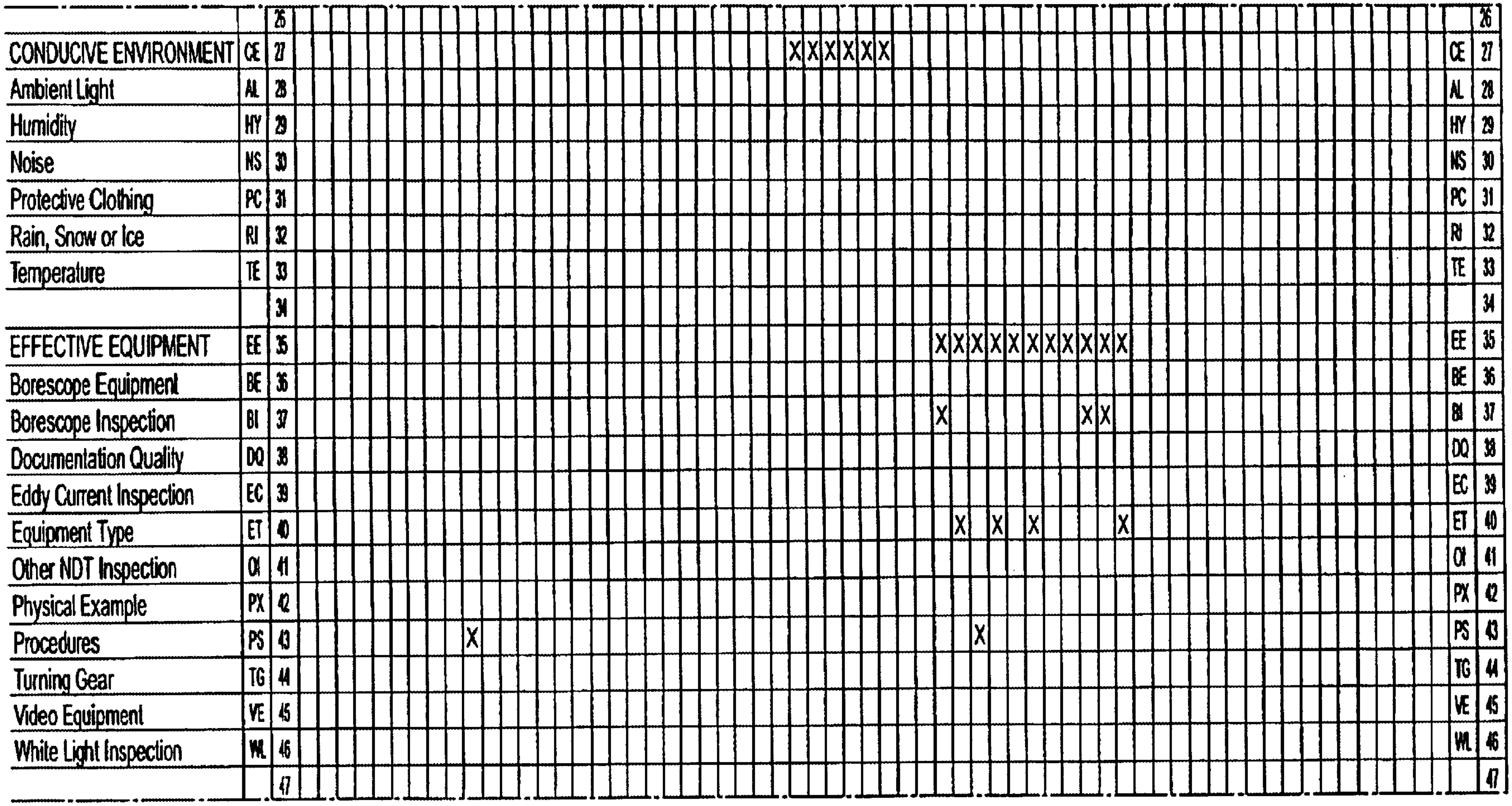
Figure 6D:
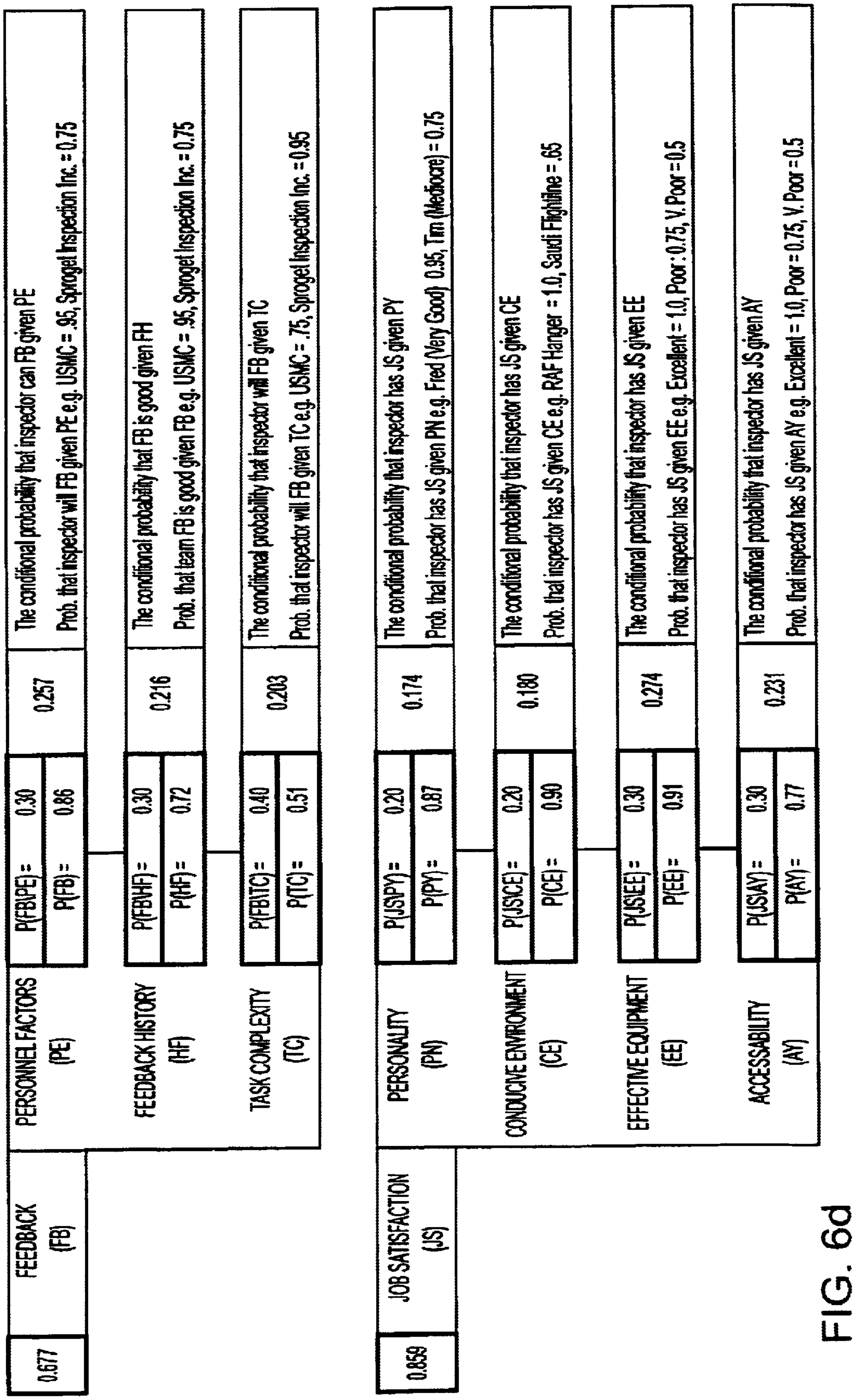
FIGS. 6*a* to 6*n* show pages of a Probabilistic Model—Conditional Probability Sheet.
Figure 6F:
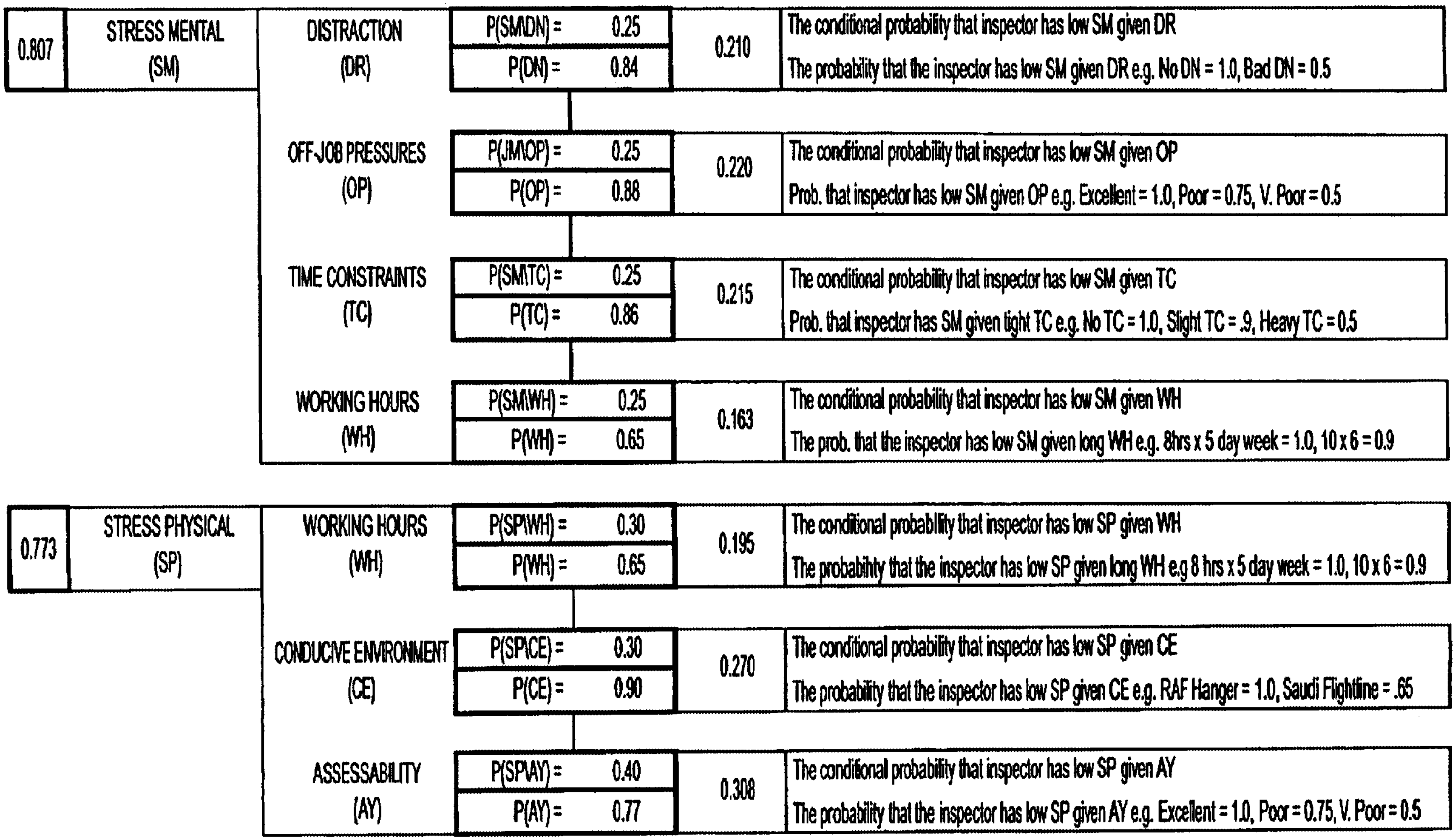
Figure 6G:
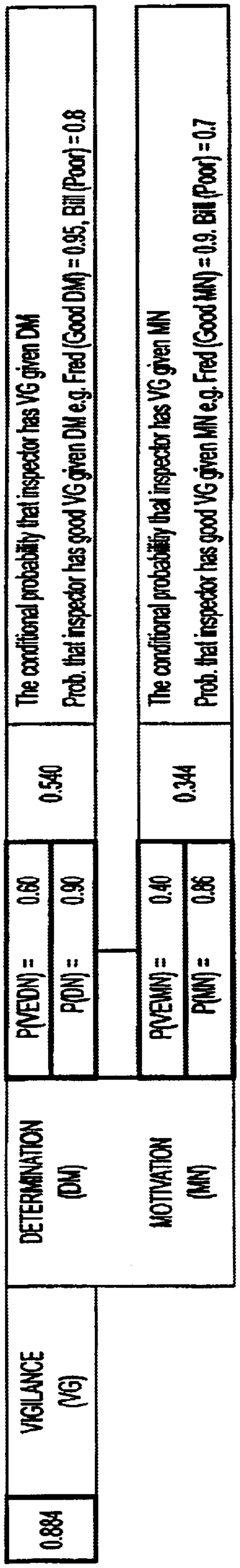

The understanding of these relationships was assisted by and developed by organising the performance shaping factors into the matrix illustrated in FIGS. 4*a*–4*c*. The matrix is made up of a column containing all the performance shaping factors. Each factor is numbered and the numbers in the row at the top (and at the bottom) of the matrix refer to the same factor. Each is taken in turn and a determination is made whether any of the other factors have an effect on it. The symbols X in the matrix represents a degree of effect. An example from the matrix is the performance shaping factor "Stress Physical". Physical Stress is caused by i) the environment in which the inspection procedure is conducted, ii) the "Working Hours" which the inspector or inspection team have worked, and iii) the "Accessibility" of the area of the engine to be inspected by the inspector.

It was found in practice that an iterative approach was required to generate the matrix. A first attempt was made at filling in the matrix followed by an initial attempt to create a diagrammatic representation of the matrix. This helped the understanding of the relationships which gave need for the matrix to be modified and in turn the diagram was updated.

The determination of which factors have an effect on other factors raises the question of the level of effect that the variables have. It can be said that some are of primary concern and others are of lower magnitudes of concern or they are simply junctions or headings which encompass several variables.

The matrix of FIGS. 4*a*–4*c* was translated into the diagrams of FIGS. 2*a*–2*d* and FIG. 3 as follows: each performance shaping factor becomes a node and each relationship generated in the matrix becomes an arrow which shows the direction of the relationship (cause and effect). This direction of relationship is important because it must describe the direction of the effect. For example, the effect "Stress Physical" is caused by long Working Hours, a poor Environment and poor Accessibility but none of these three factors are caused by Physical Stress. Thus the arrows go from the three cause factors towards "Stress Physical" effect factor. Applying the cause and effect rule above, the Effective Personnel performance shaping factors were developed into the diagram shown in FIG. 3.

Tracing the prime node namely "Effective Personnel" back, it was found that this can be sub-divided into the two groups: Personnel Factors or characteristics common to the group or inspection team, and Personal Factors those specific to the individual or inspector. The end result shown in the top left hand corner of FIG. 2*a* is the goal of this domain namely Effective Personnel. The relationships between the performance shaping factors are taken from the matrix of FIGS. 4*a*–4*c*.

When analysis of an inspection effectiveness task covering this domain is being carried out in practice, it is intended that those performance shaping factors that have been grouped into Personal Factors should be considered in terms of an individual inspector or an inspection team as applicable. This is because it is not always possible at the time the initial analysis is carried out to know the individual inspector who will carry out the inspection. The model would be applied generically to begin with and could be applied to specific personnel once the inspector(s) have been determined. While some of the performance shaping factors can objectively be determined, others like "Determination" are subjective. Only experience with application of this model will result in a fair and less subjective use.

Figure 2B:
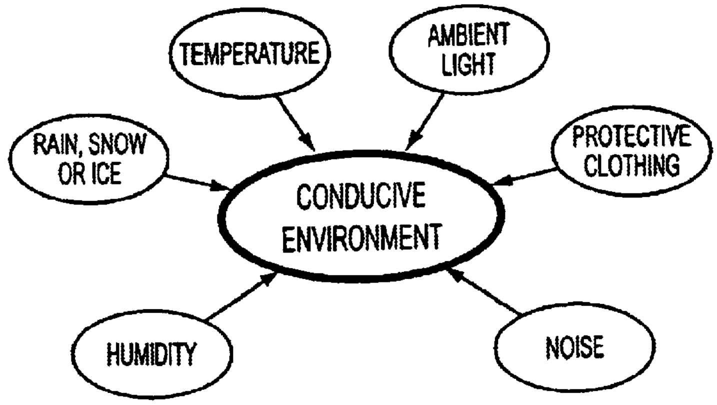
FIG. 2*b* shows a Conducive Environment Diagram.
Figure 2C:
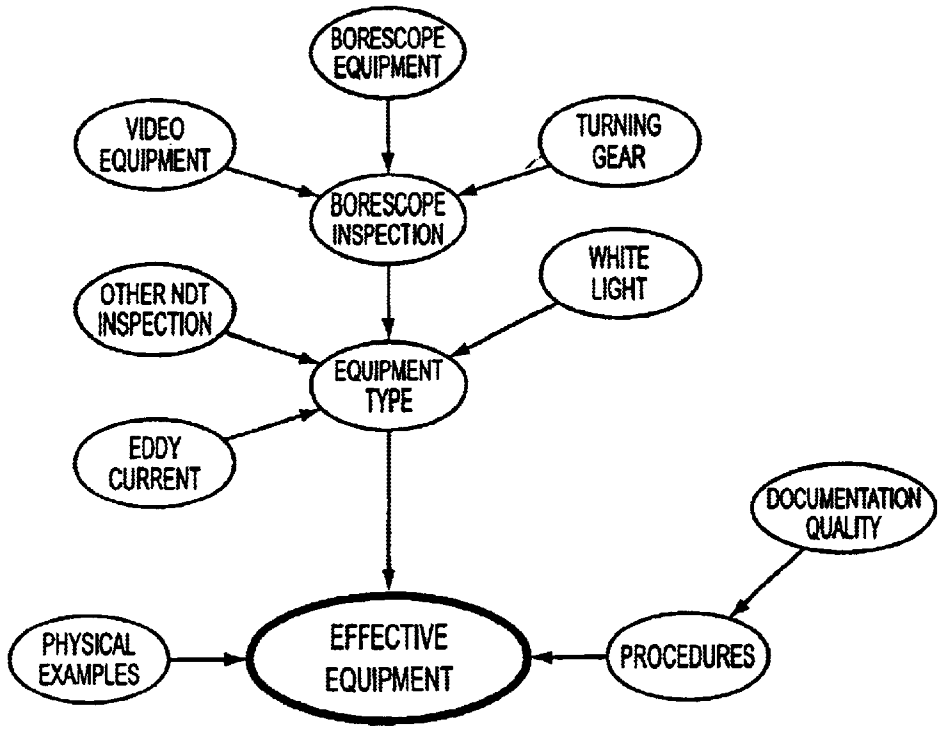
FIG. 2*c* shows an Effective Equipment Diagram.
Figure 3:
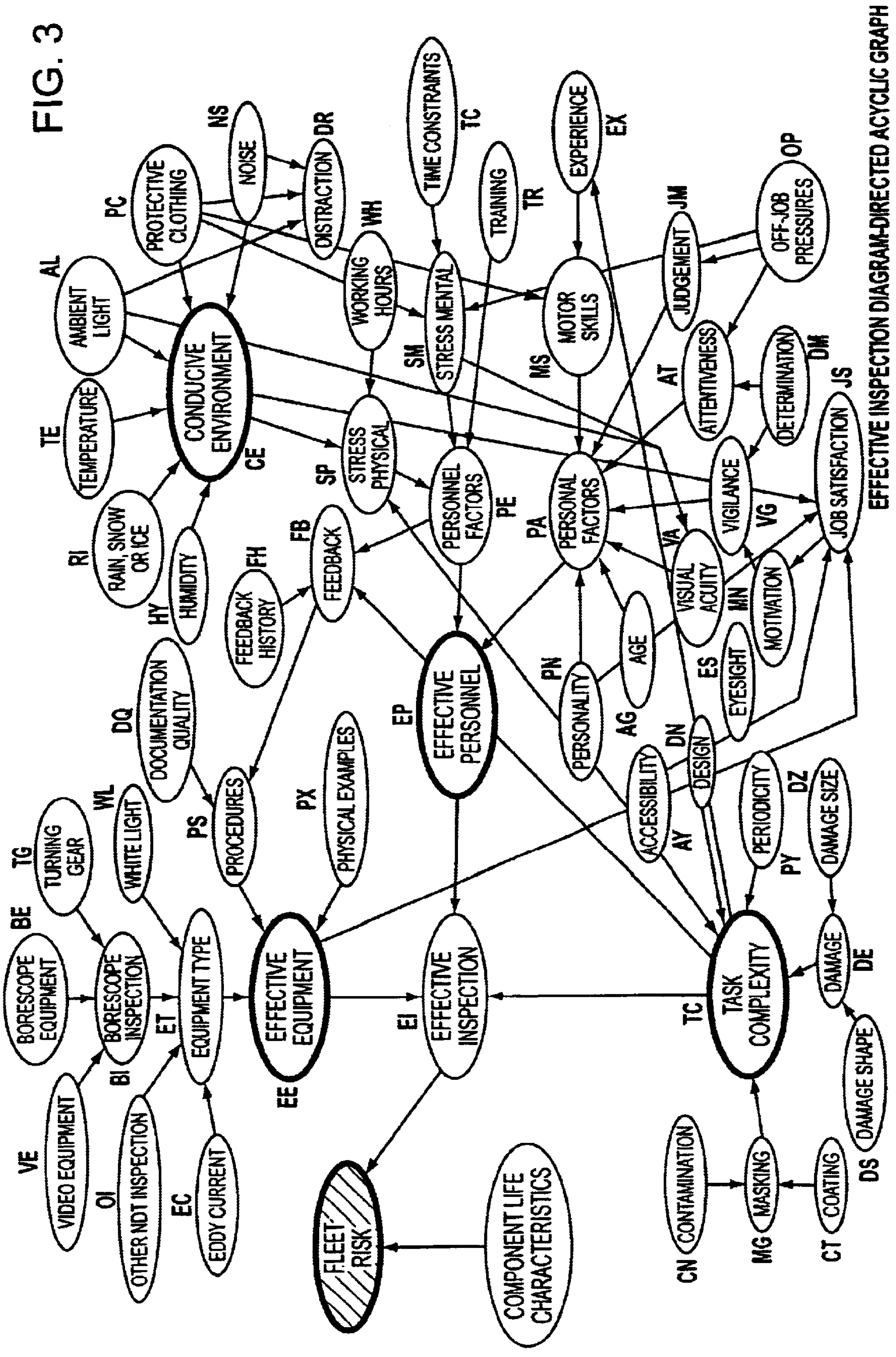
FIG. 3 shows the diagram of FIGS. 2*a*–2*d* integrated into an Effective Inspection Diagram.

Utilising the same logic, the diagrams which represent Conducive Environment in FIG. 2*b*, Effective Equipment 2*c*, and Task Complexity 2*d* were produced.

Two of the above performance shaping factors, namely "Rain, Snow or Ice" and "Protective Clothing" will seldom apply to borescope inspections. This is because the light source for the borescope requires mains electricity and will be dangerous if exposed to water. Because of the heat generated by the light source, a cooling fan is necessary and as a consequence they are not manufactured to tolerate water. Snow and ice can be encountered in northern latitudes in winter, but it is generally the case that the aircraft is brought into a hangar for maintenance work. The "Rain, Snow or Ice" option must nevertheless still be incorporated into the model in order to accommodate exceptional circumstances. "Protective Clothing" could be cold weather clothing or NBC (nuclear, biological and chemical) suits. Cold weather clothing will affect "Motor Skills" whereas NBC will affect "Motor Skills" and "Visual Acuity".

The node titled "Equipment Type" is an "or" gate (Boolean) which is switched to the appropriate inspection technique as appropriate to the design of the component or to the required inspection effectiveness. This means that if an eddy current inspection delivers the required probability of inspection effectiveness whereas a borescope inspection will not the eddy current inspection will have to be advised.

If a borescope inspection is called for on a static gas turbine engine (GTE) component, the need for Turning Gear is superfluous and this equipment will be switched out of the analysis.

Using the information contained in FIGS. 3 and 4*a*–4*c* it is possible to create a usable logic model by allocating logic functions, numerical probability and conditional probability values to each node and arrow. Any suitable software can be used to provide the model. The embodiment described was created using Microsoft Excel, which was chosen because of its availability and the simplicity of its mathematical software. The completed model is able to calculate the probability of inspection success based on all the variables that were considered relevant to the end goal.

This mathematical model works by allocating a probability to each parent mode with an understanding that in each case, the performance shaping factor is analysed in isolation to determine the effect the factor has on the inspection being 100% successful. For example if a component is contaminated, how effective will the inspection be? With no contamination the inspection will be 100% effective or have a probability of success of 1.0. Conversely if the component is heavily contaminated the probability of inspection success attributable to this factor in isolation will be low, say 0.2. However, if, despite the contamination, the inspection is conducted by an experienced inspector under ideal conditions, the probability of the inspection being effective can be improved from the 0.2 figure mentioned above.

Figure 2D:
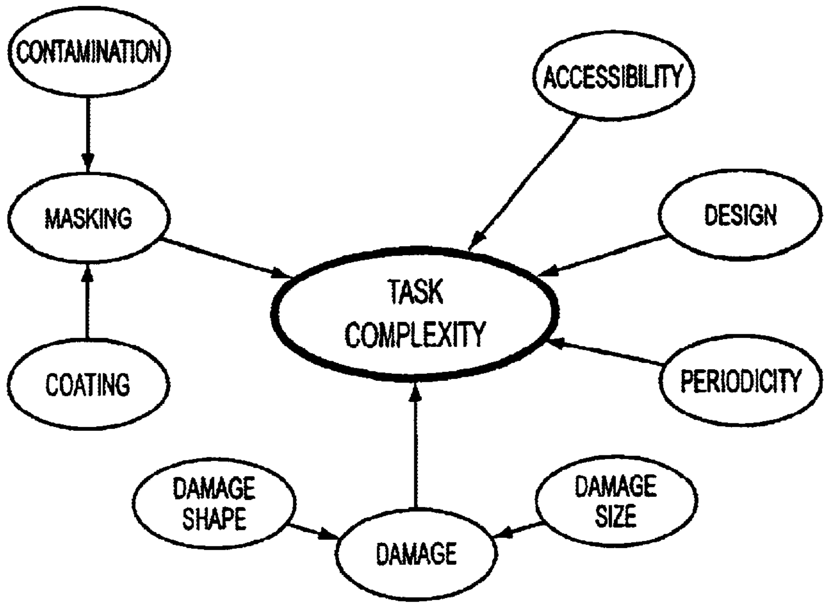
FIG. 2*d* shows a Task Complexity Diagram.

In more detail, FIG. 2*d* shows that one of the variables which affect Task Complexity is the problem of Masking. If the component is covered or coated, this makes finding a crack or other potential failure causing defect potentially difficult to find. When a component is inspected at a work bench, it is possible to rotate the component in the field of view so that any defect may be viewed from several angles. This helps considerably when trying to locate defects. During a borescope inspection, this ability is either extremely difficult or more generally impossible to achieve. When the component is dirty (contaminated) or has a coating such as Platinum Aluminium the defect can be even more difficult to locate. Dirt or Contamination can conceal the defect while coatings can change the appearance of the defect. Platinum aluminium can for example cause an inspector to think there is a defect where there is none. The effect in this case looks a little like the swirling opalescent patterns on the inside of an Oyster shell. When seen from one narrow angle of view, as with a borescope inspection, it is easy to see how a defect may be missed, or how an inspector may interpret markings resulting from a coating as a defect, when no defect is, in fact, present. Colour banding caused by temperature is another example of this. Masking due to dirt can vary dependant upon where in the engine the component is situated.

A probability value can be allocated, as mentioned above, against the anticipated degree of difficulty caused by the coating and/or contamination for the component to be inspected. It is known know from the GTE configuration control whether the component was coated or not when new. There is less certainty about the state of the coating in an engine that requires inspection. It may have worn away and the appearance will vary from engine to engine for other reasons. It is necessary to allocate a probability value that reflects the belief in the average state (across the fleet of GTE to be inspected) of the coating. This value should reflect the perceived probability of finding a fault given the estimated state of the coating.

This allocation of probabilities throughout the model must conform to the basic axioms of probability theory:

a) The probability of event (A) >0 for every event A.

b) The total probability for the sample space=1 c) The probability of the union of mutually exclusive events is the sum of their separate probabilities $$P(A_1 \cup A_2 \cup \ldots \cup A_N) = P(A_1) + P(A_2) + \ldots + P(A_n)$$

Two states are possible when considering the coating (CT) on a component. These are the probability that the coating has made the component poor for effective inspection. The other is that the coating has not made the component poor for effective inspection, in other words the component is good. Let us estimate these probabilities at 85% (0.85) good and 15% (0.15) poor. These two values add up to one so these exhaust the sample space and conform to the above rules. Doing the same for the probabilities in the case of contamination (CN) we can allocate figures of 0.9 good and 0.1 poor. We write these probabilities as follows:

If $P(CT)$ good=0.85 then $P(CT)$ poor=1−$P(CT)$ good=0.15

And $P(CN)$ good=0.90 then $P(CN)$ poor=1−$P(CN)$ good=0.10.

These two sets of probabilities are fed into a common term namely Masking (MG). At this point conditional probability must be considered. If the probabilities allocated above for both Contamination and Coating being poor had been the same i.e. one, the effect they would have on Masking would not necessarily be the same. For example, Contamination is more effective at hiding faults so it is necessary to weight the probability of a poor outcome more to Contamination than Coating. So we are looking at two sets of conditional probabilities, namely that of Masking given Coating and that of Masking given Contamination. As the probability of Masking can be at most 100% or 1.0 we must allocate this total probability between all possibilities.

The conditional probabilities for MG are

P(MGyes)|CNgood, P(MGyes)|CNpoor, P(MGno)|CNgood and P(MGno)|CNpoor

P(MGyes)|CTgood, P(MGyes)|CTpoor, P(MGno)|CTgood and P(MGno)|CTpoor

This complies with the rules of conditional probability $$P(B\backslash A)=\frac{P(A\cap B)}{P(A)}$$

Where A and B are events in the same sample space.

Conditional probabilities are allocated to the above based on data, judgement or a combination of both. So let:

P(MGyes|CN)=0.695,P(MGno|CN)=0.005,

P(MGyes|CT)=0.295 and P(MGno|CT)=0.005.

Therefore the sum of all the conditional probabilities=1.0.

For the model to work all the probabilities must follow the same logic direction, that is they must all be positive for a positive outcome. In other words, for all probabilities, a higher value is preferable from the point of view of achieving a high effectiveness value. The probability of success must be quoted for each performance shaping factor.

The same logic is applied to all the performance shaping factors and the way they are connected to create the spread sheets shown in FIG. 5 Probabilistic Model—Data Interface Sheet and FIGS. 6*a* to 6*f* Probabilistic Model—Conditional Probability Sheet. It should be noted that the goal is to find inspection effectiveness represented by an effectiveness value. This is one number (between 0 and 1) that demonstrates the probability of effective inspection.

FIGS. 5*a*–5*c* shows the Data Interface Sheet of the model where data (i.e. a probability value) on the probability of each performance shaping factor (that is a Parent Node) can be entered. The term Parent Node is used in Bayesian Belief Networks to describe a node which is a point at which a belief in the form of a probability may be entered. The column in FIGS. 5*a*–5*c* called Prob (Probability value) is where the data is input. (In the original drawing these cells are coloured white and yellow, with one blue, here these colours are denoted by the annotation "w", "y " and "b" at the right hand end of each row.) The white cells, annotated "w", are parents (inputs) and the yellow cells, annotated "y", are values calculated by the model and based on the input data. The blue cell, annotated "b", in the bottom row indicates the result of the calculations of the model, i.e. the probability of inspection effectiveness (or effectiveness value).

The column headed Logic in both FIGS. 5*a*–5*c* and FIGS. 6*a*–6*n* show the reasoning behind the required input or given output for each performance shaping factor. The numbers entered on FIGS. 5*a* –5*c* (white cells "w") are then linked into FIGS. 6*a*–6*n* (yellow cells "y") wherever appropriate. Conditional probability data is entered into the cells of FIGS. 6*a*–6*n* which give the possibilities in the form P(AB/YZ). This data is a weighting value and is used to allow the model to determine the "weight" that the parent nodes have relative to one another. As mentioned above, the weighting values for the conditional probabilities contributing to the same performance shaping factor must total 1. Thus, for example, the weighting values shown in FIGS. 6*a* and 6*b* for the performance shaping factor PE (Personnel factors) gives Training a conditional probability of 0.4, and Stress Mental and |Stress Physical conditional probabilities of 0.3. Thus, Training is believed to have a greater impact on Personnel Factors than either form of Stress. It will be noted also from FIGS. 6*c*–6*e* that Stress Physical is itself influenced by Working Hours, Conducive Environment and Accessibility. Thus, the Stress Physical probability of 0.773 (rounded to 0.77) is entered at P(SP) against Personnel Factors in FIGS. 6*a*–6*b*.

In FIG. 6*n*, the resulting probabilities from the nodes Effective Personnel, Effective Equipment and Task Complexity are used to compute the probability of Effective Inspection (the effectiveness value). It will be noted that Conducive Environment is not used directly to compute the effectiveness value. Instead, its influence flows through the model by contributing to the probabilities derived for various performance shaping factors of Effective Personnel.

FIGS. 6*m*–6*n* also shows as its final line a Fleet Risk section. The probability attributable to Fleet Risk is determined independently on the basis of engineering assessments of the characteristic life of the component in question. FIG. 7 shows a matrix of hazard risk index values. The Fleet Risk can be expressed as failures per one million flying hours, and the numbers in the boxes below the headings represent the Fleet Risk in these terms (e.g. ">1000" means a risk of more than 1000 failures in one million flying hours.

Using this matrix, a determination can be made as to whether or not a particular magnitude of risk is acceptable. For example, it may be decided that a risk falling in blocks 1 to 5 (indicated by horizontal shading) is sufficiently high to justify grounding of the fleet, since even "occasional" failure may be unacceptable if the consequences of failure are unacceptable.

The carrying out of inspections reduces this risk. By including the derived effectiveness value in the computation of Fleet Risk, a realistic and justifiable result can be achieved, which can be used in an assessment of the airworthiness of a fleet or of an individual aircraft. Furthermore, the process of deriving the effectiveness value focuses on the individual performance shaping factors and so provides an opportunity to determine areas of the inspection process which can be modified to improve the effectiveness value.

I claim:

1. A method of performing an operation comprising operation steps and evaluation steps, the evaluation steps comprising:

identifying a set of performance shaping factors which influence the outcome of the operation;

allocating a probability value to each performance shaping factor, the probability value representing the influence of the respective performance shaping factor on the performance of the operation;

allocating a weighting value to each performance shaping factor, the weighting value representing the significance of the respective performance shaping factor relative to at least one other of the performance shaping factors;

calculating, from the probability values and the weighting values, an effectiveness value representing the effectiveness of the operation.

2. A method as claimed in claim 1, wherein the operation is an inspection process.

3. A method as claimed in claim 2, wherein the inspection process is carried out on a component of a gas turbine engine.

4. A method as claimed in claim 1, wherein the operation steps are carried out before the evaluation steps.

5. A method as claimed in claim 4, wherein the effectiveness value is used to determine at least one of the operation steps, or the conditions under which it is carried out.

6. A method as claimed in claim 1, wherein the operation steps are carried out after the evaluation steps.

7. A method as claimed in claim 6, wherein the effectiveness value is used to vary at least one of the operation steps, or the conditions under which it is carried out, of a future similar operation.

8. A method as claimed in claim 1, wherein the performance shaping factors are selected from the following groups:

(a) Factors relating to personnel conducting the evaluation steps;

(b) Factors relating to the environment in which the evaluation steps are conducted;

(c) Factors relating to equipment employed to perform at least one of the evaluation steps; and (d) Factors relating to the complexity of the at least one of the evaluation steps.

9. A method as claimed in claim 1, characterized in that at least some of the evaluation steps are carried out by means of a computer program.

10. A computer programmed to carry out at least some of the evaluation steps of a method in accordance with claim 1.

11. A method as claimed in claim 2, wherein the operation steps are carried out before the evaluation steps.

12. A method as claimed in claim 3, wherein the operation steps are carried out before the evaluation steps.

13. A method of assessing the safety of equipment including a component subject to periodic inspection, the inspection comprising inspection steps and evaluation steps, the evaluation steps comprising:

identifying a set of performance shaping factors which influence the outcome of the inspection;

allocating a probability value to each performance shaping factor, the probability value representing the influence of the respective performance shaping factor on the performance of the inspection;

allocating a weighting value to each performance shaping factor, the weighting value representing the significance of the respective performance shaping factor relative to at least one other of the performance shaping factors;

calculating, from the probability values and the weighting values, an effectiveness value representing the effectiveness of the inspection;

utilizing the effectiveness value to determine the probability of undetected failure of the component;

determining the consequence of failure of the component in operation of the equipment; and comparing the probability of undetected failure and the consequence of failure with predetermined criteria and, on the basis of the comparison, either withdrawing the equipment from operational service or continuing operational service.

14. A method as claimed in claim 13, characterized in that the equipment comprises at least one aircraft.

15. A method as claimed in claim 13, characterized in that at least some of the evaluation steps are carried out by means of a computer program.

16. A computer programmed to carry out at least some of the evaluation steps of a method in accordance with claim 13.

17. A method for quantifying the effectiveness of an inspection procedure comprising:

entering a multiplicity of inputs each representing an estimate, measurement or evaluation of a variable parameter which to a greater or lesser extent affects the inspection procedure, each input being assigned an individual weighting factor that represents a measure of the influence of that parameter, the weighted inputs being combined according to a set of logic rules to produce intermediate values which are further combined in accordance with further logic rules to finally a yield a single objective figure representing the effectiveness of the inspection procedure.

* * * * *